US012567375B2

(12) United States Patent
Liu et al.

(10) Patent No.: US 12,567,375 B2
(45) Date of Patent: Mar. 3, 2026

(54) DISPLAY PANEL HAVING PIXEL CIRCUITS AND DISPLAY APPARATUS

(71) Applicant: BOE TECHNOLOGY GROUP CO., LTD., Chaoyang District (CN)

(72) Inventors: Libin Liu, Beijing (CN); Yu Feng, Beijing (CN); Shiming Shi, Beijing (CN); Dawei Wang, Beijing (CN); Haijun Qiu, Beijing (CN); Jingquan Wang, Beijing (CN); Xing Yao, Beijing (CN)

(73) Assignee: BOE Technology Group Co., Ltd., Chaoyang District (CN)

( * ) Notice: Subject to any disclaimer, the term of this patent is extended or adjusted under 35 U.S.C. 154(b) by 5 days.

(21) Appl. No.: 18/692,042

(22) PCT Filed: Sep. 27, 2022

(86) PCT No.: PCT/CN2022/121867
§ 371 (c)(1),
(2) Date: Mar. 14, 2024

(87) PCT Pub. No.: WO2024/065212
PCT Pub. Date: Apr. 4, 2024

(65) Prior Publication Data
US 2025/0140201 A1 May 1, 2025

(51) Int. Cl.
*G09G 3/3266* (2016.01)
*G09G 3/30* (2006.01)
(Continued)

(52) U.S. Cl.
CPC ............. *G09G 3/3266* (2013.01); *G09G 3/30* (2013.01); *G09G 3/32* (2013.01); *G09G 3/3233* (2013.01);
(Continued)

(58) Field of Classification Search
CPC .......... G09G 3/30; G09G 3/32; G09G 3/3266; G09G 2310/0286; G09G 2310/061;
(Continued)

(56) References Cited

U.S. PATENT DOCUMENTS 11,049,458 B1 * 6/2021 Fan ...................... G09G 3/3266
2021/0125543 A1 * 4/2021 Kim ..................... G09G 3/3233
(Continued)

FOREIGN PATENT DOCUMENTS

CN 107316613 A 11/2017
CN 108962968 A 12/2018
(Continued)

*Primary Examiner* — Adam J Snyder
(74) *Attorney, Agent, or Firm* — The Webb Law Firm

(57) ABSTRACT

A display panel includes pixel circuits, first shift register(s), second shift register(s), third shift register(s), and fourth shift register(s). A pixel circuit includes a driving transistor, a bias sub-circuit, a data writing sub-circuit, a compensation sub-circuit, a leakage prevention sub-circuit, a reset sub-circuit, and a light-emission control sub-circuit. The bias sub-circuit is electrically connected to a first shift register, which transmits a first scanning signal to the bias sub-circuit. The data writing and compensation sub-circuits are electrically connected to a second shift register, which transmits a second scanning signal to the data writing and compensation sub-circuits. The leakage prevention sub-circuit is electrically connected to a third shift register, which transmits a third scanning signal to the leakage prevention sub-circuit. The light-emission control sub-circuit is electrically connected to a fourth shift register, which transmits a fourth scanning signal to the light-emission control sub-circuit.

18 Claims, 16 Drawing Sheets

(51) Int. Cl.
*G09G 3/32* (2016.01)
*G09G 3/3233* (2016.01)

(52) U.S. Cl.
CPC ............... *G09G 2310/0286* (2013.01); *G09G 2310/061* (2013.01); *G09G 2320/0247* (2013.01); *G09G 2320/0257* (2013.01); *G09G 2330/021* (2013.01)

(58) Field of Classification Search
CPC ... G09G 2320/0247; G09G 2320/0257; G09G 2330/021; G09G 3/3233
See application file for complete search history.

(56) References Cited

U.S. PATENT DOCUMENTS

| | | | | |
|---|---|---|---|---|
| 2021/0193020 A1* | 6/2021 | Ka | ........................ | G09G 3/3266 |
| 2021/0366397 A1* | 11/2021 | Na | ........................ | G09G 3/3291 |
| 2021/0375193 A1* | 12/2021 | Son | ........................ | G09G 3/3233 |
| 2023/0162664 A1* | 5/2023 | Kim | ...................... | G09G 3/3266<br>345/55 |

FOREIGN PATENT DOCUMENTS

| | | | |
|---|---|---|---|
| CN | 111462694 | A | 7/2020 |
| CN | 113906495 | A | 1/2022 |
| CN | 114550653 | A | 5/2022 |
| KR | 1020200081071 | A | 7/2020 |

* cited by examiner

DISPLAY PANEL HAVING PIXEL CIRCUITS AND DISPLAY APPARATUS

CROSS-REFERENCE TO RELATED APPLICATION

This application is the United States national phase of International Patent Application No. PCT/CN2022/121867 filed Sep. 27, 2022, the disclosure of which is hereby herein by reference in its entirety.

BACKGROUND OF THE INVENTION

Field of the Invention

The present disclosure relates to the field of display technologies, and in particular, to a display panel and a display apparatus.

Description of Related Art

Organic light-emitting diode (OLED) display panels have attracted much attention due to their advantages of active-luminescence, wide viewing angle, high contrast, fast response speed, low power consumption and so on.

SUMMARY OF THE INVENTION

In an aspect, a display panel is provided. The display panel includes a plurality of pixel circuits, a plurality of light-emitting devices, at least one first shift register, at least one second shift register, at least one third shift register, and at least one fourth shift register. The plurality of pixel circuits are arranged in multiple rows and multiple columns. A pixel circuit of the plurality of pixel circuits includes a driving transistor, a bias sub-circuit, a data writing sub-circuit, a compensation sub-circuit, a leakage prevention sub-circuit, a reset sub-circuit, and a light-emission control sub-circuit. A first shift register is correspondingly connected to at least one row of pixel circuits, and the first shift register is configured to transmit a first scanning signal to the at least one row of pixel circuits correspondingly connected thereto. A second shift register is correspondingly connected to a row of pixel circuits, and the second shift register is configured to transmit a second scanning signal to the row of pixel circuits correspondingly connected thereto. A third shift register is correspondingly connected to at least one row of pixel circuits, and the third shift register is configured to transmit a third scanning signal to the at least one row of pixel circuits correspondingly connected thereto. A fourth shift register is correspondingly connected to at least one row of pixel circuits, and the fourth shift register is configured to transmit a fourth scanning signal to the at least one row of pixel circuits correspondingly connected thereto. The bias sub-circuit is electrically connected to the first shift register, a reference voltage terminal and a source of the driving transistor, and is configured to, under control of the first scanning signal, transmit a reference voltage from the reference voltage terminal to the source of the driving transistor. The data writing sub-circuit is electrically connected to the second shift register, a data signal terminal and the source of the driving transistor, and is configured to, under control of the second scanning signal, transmit a data signal from the data signal terminal to the source of the driving transistor. The compensation sub-circuit is electrically connected to the second shift register, a drain of the driving transistor and a first node, and is configured to, under control of the second scanning signal, transmit a compensated data signal to the first node. The leakage prevention sub-circuit is electrically connected to the third shift register, the first node and a gate of the driving transistor, and is configured to, under control of the third scanning signal, cause a connection to be formed between the first node and the gate of the driving transistor. The reset sub-circuit is electrically connected to the first node and a light-emitting device, electrically connected to the pixel circuit, of the plurality light-emitting devices, and is configured to reset a voltage of the first node and a voltage of the light-emitting device. The light-emission control sub-circuit is electrically connected to the fourth shift register, a first voltage signal terminal, the driving transistor and the light-emitting device, and is configured to, under control of the fourth scanning signal, cause a path to be formed between the driving transistor and the light-emission control sub-circuit to transmit a driving current to the light-emitting device.

In some embodiments, a row of pixel circuits has opposite two sides along a first direction; and at least one of the first shift register and the third shift register is located at one side of the two sides, and the first direction is a direction in which the row of pixel circuits is arranged.

In some embodiments, a row of pixel circuits is correspondingly connected to one first shift register, two third shift registers and one fourth shift register; and the row of pixel circuits has opposite two sides along a first direction, and the first direction is a direction in which the row of pixel circuits is arranged. The fourth shift register and one of the third shift registers are located at one side of the two sides, and the first shift register and an other one of the third shift registers are located at an other side of the two sides.

In some embodiments, the fourth shift register is further away from the row of pixel circuits than the third shift register that is located at a same side as the fourth shift register; and the first shift register is further away from the row of pixel circuits than the third shift register that is located at a same side as the first shift register.

In some embodiments, a row of pixel circuits is correspondingly connected to one second shift register, two first shift registers and one fourth shift register; and the row of pixel circuits has opposite two sides along a first direction, and the first direction is a direction in which the row of pixel circuits is arranged. The fourth shift register and one of the first shift registers are located at one side of the two sides, and the third shift register and an other one of the first shift registers are located at an other side of the two sides.

In some embodiments, the fourth shift register is further away from the row of pixel circuits than the first shift register that is located at a same side as the fourth shift register; and the third shift register is further away from the row of pixel circuits than the first shift register that is located at a same side as the first shift register.

In some embodiments, the reset sub-circuit is further electrically connected to the first shift register and an initial voltage terminal, and the reset sub-circuit is configured to, under the control of the first scanning signal, transmit an initial voltage from the initial voltage terminal to the first node and the light-emitting device.

In some embodiments, the display panel further includes at least one fifth shift register. A fifth shift register is correspondingly connected to at least one row of pixel circuits, and the fifth shift register is configured to transmit a fifth scanning signal to the at least one row of pixel circuits correspondingly connected thereto. The first scanning signal and the fifth scanning signal are different scanning signals. The reset sub-circuit is further electrically connected to the fifth shift register and an initial voltage terminal, and the reset sub-circuit is configured to, under control of the fifth scanning signal, transmit an initial voltage from the initial voltage terminal to the first node and the light-emitting device.

In some embodiments, a row of pixel circuits is electrically connected to one first shift register, one third shift register, one fourth shift register and one fifth shift register. The row of pixel circuits has opposite two sides along a first direction, where the first direction is a direction in which the row of pixel circuits is arranged. The fourth shift register and the fifth shift register are located at one side of the two sides, and the fourth shift register is further away from the row of pixel circuits than the fifth shift register. The first shift register and the third shift register are located at an other side of the two sides, and the third shift register is further away from the row of pixel circuits than the first shift register.

In some embodiments, a row of pixel circuits is correspondingly connected to two second shift registers; one of the second shift registers is located at one side of opposite two sides of the row of pixel circuits along a first direction, and is adjacent to the row of pixel circuits; and an other one of the second shift registers is located at an other side of the opposite two sides of the row of pixel circuits along the first direction, and is adjacent to the row of pixel circuits.

In some embodiments, the first shift register, the third shift register and the fourth shift register each include a "12T3C" circuit, where the "12T3C" circuit includes twelve transistors and three capacitors, and the second shift register includes an "8T2C" circuit, where the "8T2C" circuit includes eight transistors and two capacitors.

In some embodiments, the display panel further includes a first clock signal line, a second clock signal line, a third clock signal line, a fourth clock signal line, a fifth clock signal line, a sixth clock signal line, a seventh clock signal line, an eighth clock signal line, a ninth clock signal line, and a tenth clock signal line; a first low-voltage signal line, a second low-voltage signal line, a third low-voltage signal line, a fourth low-voltage signal line, a fifth low-voltage signal line, a sixth low-voltage signal line, and a seventh low-voltage signal line; a first high-voltage signal line, a second high-voltage signal line, a third high-voltage signal line, and a fourth high-voltage signal line; and a first start signal line, a second start signal line, a third start signal line, and a fourth start signal line. The first shift register is electrically connected to the first low-voltage signal line, the first clock signal line, the second clock signal line, the first start signal line, the first high-voltage signal line, and the second low-voltage signal line. The second shift register is electrically connected to two of the third clock signal line, the fourth clock signal line, the fifth clock signal line, and the sixth clock signal line, and is electrically connected to the third low-voltage signal line, the second start signal line and the second high-voltage signal line. The third shift register is electrically connected to the fourth low-voltage signal line, the seventh clock signal line, the eighth clock signal line, the third start signal line, the third high-voltage signal line, and the fifth low-voltage signal line. The fourth shift register is electrically connected to the sixth low-voltage signal line, the ninth clock signal line, the tenth clock signal line, the fourth start signal line, the fourth high-voltage signal line, and the seventh low-voltage signal line.

In some embodiments, a row of pixel circuits is correspondingly connected to one first shift register, two third shift registers and one fourth shift register. The row of pixel circuits has opposite two sides along a first direction.

The two sides include a side at which the fourth shift register is located; and at the side and along a direction that is in the first direction and from the side to the plurality of pixel circuits, a sixth low-voltage signal line, a ninth clock signal line, a tenth clock signal line, a fourth start signal line, a fourth high-voltage signal line, a seventh low-voltage signal line, a fourth low-voltage signal line, a seventh clock signal line, an eighth clock signal line, a third start signal line, a third high-voltage signal line, a fifth low-voltage signal line, a third low-voltage signal line, a third clock signal line, a fourth clock signal line, a fifth clock signal line, a sixth clock signal line, a second start signal line, and a second high-voltage signal line are arranged in sequence.

The two sides include a side at which the first shift register is located; and at the side and along a direction that is in the first direction and from the side to the plurality of pixel circuits, a first low-voltage signal line, a first clock signal line, a second clock signal line, a first start signal line, a first high-voltage signal line, a second low-voltage signal line, a fourth low-voltage signal line, a seventh clock signal line, an eighth clock signal line, a third start signal line, a third high-voltage signal line, a fifth low-voltage signal line, a third low-voltage signal line, a third clock signal line, a fourth clock signal line, a fifth clock signal line, a sixth clock signal line, a second start signal line, and a second high-voltage signal line are arranged in sequence.

In some embodiments, a row of pixel circuits is correspondingly connected to one third shift register, two first shift registers and one fourth shift register. The row of pixel circuits has opposite two sides along a first direction.

The two sides include a side at which the fourth shift register is located; and at the side and along a direction that is in the first direction and from the side to the plurality of pixel circuits, a sixth low-voltage signal line, a ninth clock signal line, a tenth clock signal line, a fourth start signal line, a fourth high-voltage signal line, a seventh low-voltage signal line, a first low-voltage signal line, a first clock signal line, a second clock signal line, a first start signal line, a first high-voltage signal line, a second low-voltage signal line, a third low-voltage signal line, a third clock signal line, a fourth clock signal line, a fifth clock signal line, a sixth clock signal line, a second start signal line, and a second high-voltage signal line are arranged in sequence.

The two sides include a side at which the third shift register is located; and at the side and along a direction that is in the first direction and from the side to the plurality of pixel circuits, a fourth low-voltage signal line, a seventh clock signal line, an eighth clock signal line, a third start signal line, a third high-voltage signal line, a fifth low-voltage signal line, a first low-voltage signal line, a first clock signal line, a second clock signal line, a first start signal line, a first high-voltage signal line, a second low-voltage signal line, a third low-voltage signal line, a third clock signal line, a fourth clock signal line, a fifth clock signal line, a sixth clock signal line, a second start signal line, and a second high-voltage signal line are arranged in sequence.

In some embodiments, the display panel further includes at least one fifth shift register, an eleventh clock signal line, a twelfth clock signal line, a thirteenth clock signal line, a fourteenth clock signal line, an eighth low-voltage signal line, a fifth high-voltage signal line, and a fifth start signal line. A fifth shift register is electrically connected to two of the eleventh clock signal line, the twelfth clock signal line, the thirteenth clock signal line, and the fourteenth clock signal line, and is electrically connected to the eighth low-voltage signal line, the fifth start signal line and the fifth high-voltage signal line.

In some embodiments, a row of pixel circuits is electrically connected to one first shift register, one third shift register, one fourth shift register and one fifth shift register. The row of pixel circuits has opposite two sides in a first direction.

The two sides include a side at which the fourth shift register and the fifth shift register are located; and at the side and along a direction that is in the first direction and from the side to the plurality of pixel circuits, a sixth low-voltage signal line, a ninth clock signal line, a tenth clock signal line, a fourth start signal line, a fourth high-voltage signal line, a seventh low-voltage signal line, an eighth low-voltage signal line, an eleventh clock signal line, a twelfth clock signal line, a thirteenth clock signal line, a fourteenth clock signal line, a fifth start signal line, a fifth high-voltage signal line, a third low-voltage signal line, a third clock signal line, a fourth clock signal line, a fifth clock signal line, a sixth clock signal line, a second start signal line, and a second high-voltage signal line are arranged in sequence.

The two sides include a side at which the first shift register and the third shift register are located; and at the side and along the direction that is in the first direction and from the side to the plurality of pixel circuits, a fourth low-voltage signal line, a seventh clock signal line, an eighth clock signal line, a third start signal line, a third high-voltage signal line, a fifth low-voltage signal line, a first low-voltage signal line, a first clock signal line, a second clock signal line, a first start signal line, a first high-voltage signal line, a second low-voltage signal line, a third low-voltage signal line, a third clock signal line, a fourth clock signal line, a fifth clock signal line, a sixth clock signal line, a second start signal line, and a second high-voltage signal line are arranged in sequence.

In some embodiments, the display panel further includes a first clock signal line, a second clock signal line, a third clock signal line, a fourth clock signal line, a fifth clock signal line, a sixth clock signal line, a seventh clock signal line, an eighth clock signal line, a ninth clock signal line, and a tenth clock signal line; a first low-voltage signal line, a second low-voltage signal line, a third low-voltage signal line, and a fourth low-voltage signal line; a first high-voltage signal line, a second high-voltage signal line, a third high-voltage signal line, and a fourth high-voltage signal line; and a first start signal line. The first shift register is electrically connected to the first clock signal line, the second clock signal line, the first high-voltage signal line, and the first low-voltage signal line. The second shift register is electrically connected to two of the third clock signal line, the fourth clock signal line, the fifth clock signal line, and the sixth clock signal line, and is electrically connected to the second low-voltage signal line, the first start signal line and the second high-voltage signal line. The third shift register is electrically connected to the seventh clock signal line, the eighth clock signal line, the third high-voltage signal line, and the third low-voltage signal line. The fourth shift register is electrically connected to the ninth clock signal line, the tenth clock signal line, the fourth high-voltage signal line, and the fourth low-voltage signal line.

In some embodiments, a row of pixel circuits is correspondingly connected to one first shift register, two third shift registers and one fourth shift register. The row of pixel circuits has opposite two sides along a first direction.

The two sides include a side at which the fourth shift register is located; and at the side and along a direction that is in the first direction and from the side to the plurality of pixel circuits, a ninth clock signal line, a tenth clock signal line, a fourth high-voltage signal line, a fourth low-voltage signal line, a seventh clock signal line, an eighth clock signal line, a third high-voltage signal line, a third low-voltage signal line, a second low-voltage signal line, a third clock signal line, a fourth clock signal line, a fifth clock signal line, a sixth clock signal line, a first start signal line, and a second high-voltage signal line are arranged in sequence.

The two sides include a side at which the first shift register is located; and at the side and along the direction that is in the first direction and from the side to the plurality of pixel circuits, a first clock signal line, a second clock signal line, a first high-voltage signal line, a first low-voltage signal line, a seventh clock signal line, an eighth clock signal line, a third high-voltage signal line, a third low-voltage signal line, a second low-voltage signal line, a third clock signal line, a fourth clock signal line, a fifth clock signal line, a sixth clock signal line, a first start signal line, and a second high-voltage signal line are arranged in sequence.

In some embodiments, a row of pixel circuits is correspondingly connected to one third shift register, two first shift registers and one fourth shift register. The row of pixel circuits has opposite two sides along a first direction.

The two sides include a side at which the fourth shift register is located; and at the side and along a direction that is in the first direction and from the side to the plurality of pixel circuits, a ninth clock signal line, a tenth clock signal line, a fourth high-voltage signal line, a fourth low-voltage signal line, a first clock signal line, a second clock signal line, a first high-voltage signal line, a first low-voltage signal line, a second low-voltage signal line, a third clock signal line, a fourth clock signal line, a fifth clock signal line, a sixth clock signal line, a first start signal line, and a second high-voltage signal line are arranged in sequence.

The two sides include a side at which the third shift register is located; and at the side and along the direction that is in the first direction and from the side to the plurality of pixel circuits, a seventh clock signal line, an eighth clock signal line, a third high-voltage signal line, a third low-voltage signal line, a first clock signal line, a second clock signal line, a first high-voltage signal line, a first low-voltage signal line, a second low-voltage signal line, a third clock signal line, a fourth clock signal line, a fifth clock signal line, a sixth clock signal line, a first start signal line, and a second high-voltage signal line are arranged in sequence.

In some embodiments, the display panel further includes at least one fifth shift register, an eleventh clock signal line, a twelfth clock signal line, a thirteenth clock signal line, a fourteenth clock signal line, a fifth low-voltage signal line, a second start signal line, and a fifth high-voltage signal line. A fifth shift register is electrically connected to two of the eleventh clock signal line, the twelfth clock signal line, the thirteenth clock signal line, and the fourteenth clock signal line, and is electrically connected to the fifth low-voltage signal line, the second start signal line and the fifth high-voltage signal line.

In some embodiments, a row of pixel circuits is electrically connected to one first shift register, one third shift register, one fourth shift register and one fifth shift register. The row of pixel circuits has opposite two sides in a first direction.

The two sides include a side at which the fourth shift register and the fifth shift register are located; and at the side and along a direction that is in the first direction and from the side to the plurality of pixel circuits, a ninth clock signal line, a tenth clock signal line, a fourth high-voltage signal line, a fourth low-voltage signal line, a fifth low-voltage signal line, an eleventh clock signal line, a twelfth clock signal line, a thirteenth clock signal line, a fourteenth clock signal line, a second start signal line, a fifth high-voltage signal line, a second low-voltage signal line, a third clock signal line, a fourth clock signal line, a fifth clock signal line, a sixth clock signal line, a first start signal line, and a second high-voltage signal line are arranged in sequence.

The two sides include a side at which the first shift register and the third shift register are located; and at the side and along the direction that is in the first direction and from the side to the plurality of pixel circuits, a seventh clock signal line, an eighth clock signal line, a third high-voltage signal line, a third low-voltage signal line, a first clock signal line, a second clock signal line, a first high-voltage signal line, a first low-voltage signal line, a second low-voltage signal line, a third clock signal line, a fourth clock signal line, a fifth clock signal line, a sixth clock signal line, a first start signal line, and a second high-voltage signal line are arranged in sequence.

In some embodiments, the bias sub-circuit includes a first transistor; and of the first transistor, a control electrode is electrically connected to the first shift register, a first electrode is electrically connected to the reference voltage terminal, and a second electrode is electrically connected to the source of the driving transistor. The data writing sub-circuit includes a second transistor; and of the second transistor, a control electrode is electrically connected to the second shift register, a first electrode is electrically connected to the data signal terminal, and a second electrode is electrically connected to the source of the driving transistor. The compensation sub-circuit includes a third transistor; and of the third transistor, a control electrode is electrically connected to the second shift register, a first electrode is electrically connected to the drain of the driving transistor, and a second electrode is electrically connected to the first node. The leakage prevention sub-circuit includes a fourth transistor; and of the fourth transistor, a control electrode is electrically connected to the third shift register, a first electrode is electrically connected to the first node, and a second electrode is electrically connected to the gate of the driving transistor. The reset sub-circuit includes a fifth transistor and a sixth transistor. A control electrode of the fifth transistor is electrically connected to the first shift register, a first electrode of the fifth transistor is electrically connected to an initial voltage terminal, a second electrode of the fifth transistor is electrically connected to the first node, a control electrode of the sixth transistor is electrically connected to the first shift register, a first electrode of the sixth transistor is electrically connected to the initial voltage terminal, and a second electrode of the sixth transistor is electrically connected to the light-emitting device; alternatively, the display panel further includes at least one fifth shift register, the control electrode of the fifth transistor is electrically connected to a fifth shift register, the first electrode of the fifth transistor is electrically connected to the initial voltage terminal, the second electrode of the fifth transistor is electrically connected to the first node, the control electrode of the sixth transistor is electrically connected to the fifth shift register, the first electrode of the sixth transistor is electrically connected to the initial voltage terminal, and the second electrode of the sixth transistor is electrically connected to the light-emitting device. The light-emission control sub-circuit includes a seventh transistor and an eighth transistor; of the seventh transistor, a control electrode is electrically connected to the fourth shift register, a first electrode is electrically connected to the first voltage signal terminal, a second electrode is electrically connected to the source of the driving transistor; and of the eighth transistor, a control electrode is electrically connected to the fourth shift register, a first electrode is electrically connected to the drain of the driving transistor, and a second electrode is electrically connected to the light-emitting device.

In some embodiments, a frame period (which may also be referred to as a frame) of the display panel includes a refresh frame period including a first bias phase, a reset phase after the first bias phase, a data writing phase after the reset phase, a second bias phase after the data writing phase, and a light-emitting phase after the second bias phase. The first shift register is configured to output the first scanning signal in the first bias phase and the second bias phase. The second shift register is configured to output the second scanning signal in the data writing phase. The third shift register is configured to output the third scanning signal in the reset phase and the data writing phase. The fourth shift register is configured to output the fourth scanning signal in the light-emitting phase. In a case where the reset sub-circuit is electrically connected to the first shift register, the first shift register is further configured to output the first scanning signal in the reset phase; or in a case where the display panel further includes at least one fifth shift register, a fifth shift register is configured to output a fifth scanning signal in the reset phase.

In another aspect, a display apparatus is provided, which includes a driving circuit board and the display panel described in any of the above embodiments. The display panel includes a plurality of sub-pixels. The driving circuit board is electrically connected to the plurality of sub-pixels and configured to transmit data signals to the plurality of sub-pixels.

BRIEF DESCRIPTION OF THE DRAWINGS

The terms Fig., Figs., Figure, and Figures are used interchangeably in the specification to refer to the corresponding figures in the drawings.

In order to describe technical solutions in the present disclosure more clearly, the accompanying drawings to be used in some embodiments of the present disclosure will be introduced briefly; obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DESCRIPTION OF THE INVENTION

Figure 1:
FIG. 1 is a structural diagram of a display apparatus, in accordance with some embodiments.

The technical solutions in embodiments of the present disclosure will be described clearly and completely with reference to the accompanying drawings.

Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of (or multiple)" means two or more unless otherwise specified.

Some embodiments may be described using the term "connected" and its derivatives. For example, the term "connected" may be used in the description of some embodiments to indicate that two or more components are in direct physical or electrical contact with each other.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" used herein means an open and inclusive expression, which does not exclude devices that are applicable to or configured to perform additional tasks or steps.

In addition, the phrase "based on" used is meant to be open and inclusive, since a process, step, calculation or other action that is "based on" one or more of the stated conditions or values may, in practice, be based on additional conditions or values exceeding those stated.

It will be understood that, in a case that a layer or element is referred to be on another layer or substrate, it may be that the layer or element is directly on the another layer or substrate, or it may be that there is an intermediate layer between the layer or element and the another layer or substrate.

Exemplary embodiments are described herein with reference to sectional views and/or plan views as idealized exemplary drawings. In the drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments.

In transistors in the embodiments of the present disclosure, a control electrode of a transistor is a gate of the transistor, a first electrode of the transistor is one of a source and a drain of the transistor, and a second electrode of the transistor is the other of the source and the drain of the transistor. Since the source and the drain of the transistor may be symmetrical in structure, there may be no difference in structure between the source and the drain thereof. That is, the first electrode and the second electrode of the transistor in the embodiments of the present disclosure may be indistinguishable in structure. For example, the first electrode of the transistor is the source, and the second electrode of the transistor is the drain.

In the embodiments of the present disclosure, a capacitor may be a capacitive device individually fabricated by a process, for example, by fabricating specialized capacitive electrodes to realize the capacitive device, and the individual capacitive electrodes of the capacitor may be realized by a metal layer, a semiconductor layer (e.g., doped polycrystalline silicon), or the like. Alternatively, the capacitor may be realized by using a parasitic capacitance between transistors, or may be realized by the transistors themselves with other devices and lines, or may be realized by using a parasitic capacitance between the lines of a circuit itself.

In circuits provided in the embodiments of the present disclosure, a first node, a second node, a third node, a first control node, and a second control node do not indicate physically existing components, but rather indicate junctions of related electrical connections in circuit diagrams. That is, these nodes are nodes that are equivalently formed from the junctions of related electrical connections in circuit diagrams.

Embodiments of the present disclosure provide a display apparatus 1000. Referring to FIG. 1, the display apparatus 1000 may be any apparatus that can display an image whether in motion (e.g., video) or stationary (e.g., a still image), and whether textual or pictorial. For example, the display apparatus 1000 may be any product or component having a display function, such as a television, a notebook computer, a tablet computer, a mobile phone, an electronic photo, an electronic billboard or sign, a personal digital assistant (PDA), a navigator, a wearable device, an augmented reality (AR) device or a virtual reality (VR) device.

The display apparatus 1000 may be an electroluminescent display apparatus or a photoluminescent display apparatus. In a case where the display apparatus 1000 is an electroluminescent display apparatus, the electroluminescent display apparatus may be an organic electroluminescent (organic light-emitting diode, OLED for short) display apparatus or a quantum dot electroluminescent (quantum dot light-emitting diode, QLED for short) display apparatus. In a case where the display apparatus 1000 is a photoluminescent display apparatus, the photoluminescent display apparatus may be a quantum dot photoluminescent display apparatus.

Figure 2:
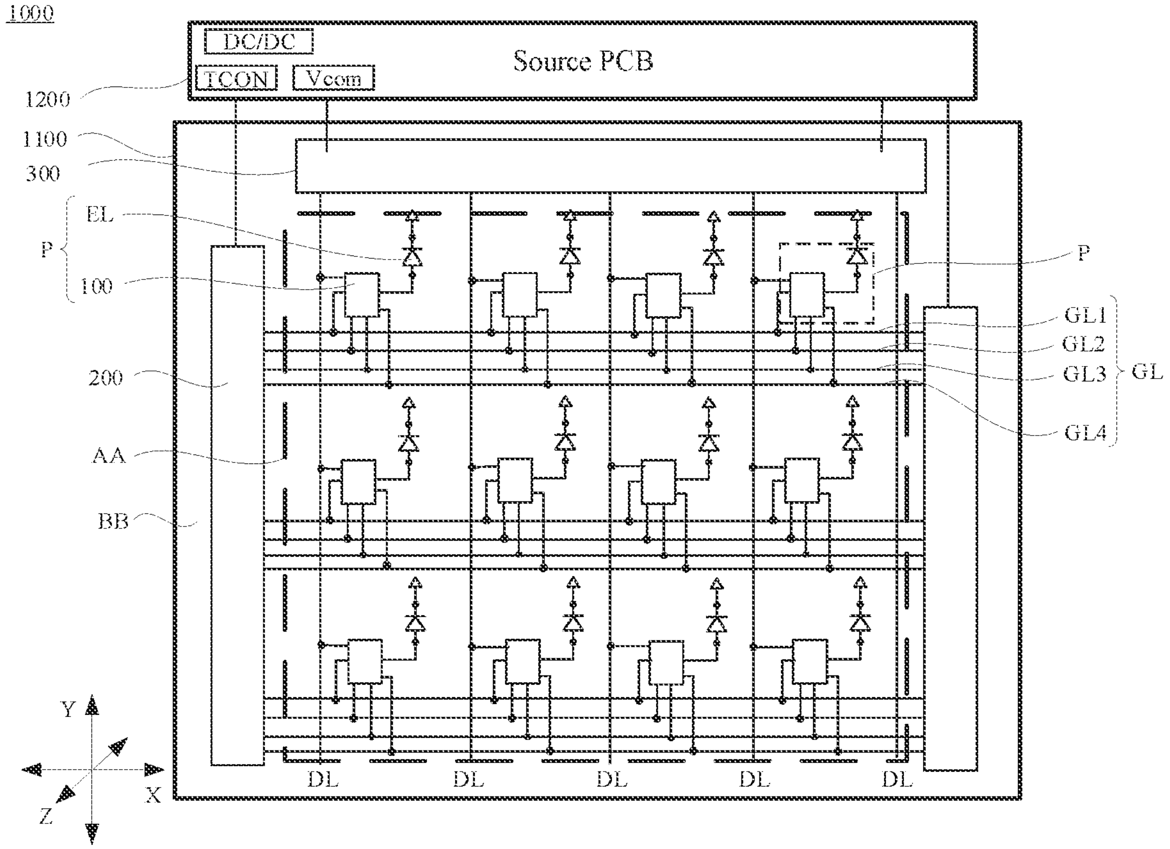
FIG. 2 is a structural diagram of another display apparatus, in accordance with some embodiments.

In some embodiments, referring to FIG. 2, the display apparatus 1000 includes a display panel 1100 and a driving circuit board (source printed circuit board, source PCB for short) 1200. The display panel 1100 may include a display area AA and a peripheral area BB (which may also be called a non-display area). The peripheral area BB is located on at least one side of the display area AA. The embodiments of the present disclosure will be described as an example of the peripheral area BB surrounding the display area AA, as shown in FIG. 2.

The display area AA may include a plurality of sub-pixels P, a plurality of data lines DL, and a plurality of scanning signal lines GL (refer to the following, such as GL1, GL2, GL3, and GL4 as shown in FIG. 2). The plurality of sub-pixels P are arranged in multiple rows and multiple columns. Each row includes multiple sub-pixels P arranged along a first direction X, i.e., the first direction X is a direction in which a row of sub-pixels P is arranged, and the multiple rows are arranged along a second direction Y. Each column includes multiple sub-pixels P arranged along the second direction Y, i.e., the second direction Y is a direction in which a column of sub-pixels P is arranged; and the multiple columns are arranged along the first direction X. Here, the first direction X intersects the second direction Y, for example, the first direction X is perpendicular to the second direction Y.

As shown in FIG. 2, a sub-pixel P is the smallest light-emitting unit of the display panel 1100, and the sub-pixel P includes a pixel circuit 100 and a light-emitting device EL. Similar to the arrangement of the plurality of sub-pixels P, the plurality of pixel circuits 100 included in the plurality of sub-pixels P are arranged in multiple rows and multiple columns. Each row includes multiple pixel circuits 100 arranged along the first direction X, and each column includes multiple pixel circuits 100 arranged along the second direction Y.

The peripheral area BB may include at least gate driving circuit(s) 200 and a source driver 300. Each gate driving circuit 200 may include a plurality of shift registers (gate driver on array, GOA for short), in which each shift register is electrically connected to one or more rows of pixel circuits 100 through multiple gate lines GL. For example, each row of pixel circuits 100 is electrically connected to a gate driving circuit 200 through multiple scanning signal lines GL.

The driving circuit board 1200 may include driving circuits such as a timing controller (TCON), a power management chip (direct current to direct current converter, DC/DC for short), and an adjustable resistance voltage division circuit (Vcom for short, for generating Vcom signal). The driving circuit board 1200 is electrically connected to the source driver 300 to control the source driver 300 to output data signals. And the driving circuit board 1200 is electrically connected to the gate driving circuit(s) 200 to transmit control signals to the shift registers, so that respective shift registers GOA scan multiple rows of pixel circuits 100 line by line. In this way, image display is realized by the combined action of electronic elements and circuits such as the driving circuit board 1200, the source driver 300, the gate driving circuit(s) 200, the pixel driving circuits 100, and the light-emitting device EL.

In some embodiments, the pixel circuit 100 may include multiple switching devices and at least one capacitor Cst. For example, the switching device may be a field effect transistor (FET), such as a thin film transistor (TFT), which is not specifically limited by embodiments of the present disclosure. Embodiments in the present application are described taking an example in which the switching device is a TFT, that is, the pixel circuit 100 includes multiple TFTs.

Here, the TFT may be a P-type transistor or an N-type transistor. The P-type transistor is turned on under the action of low potential and turned off under the action of high potential; the N-type transistor is turned on under the action of high potential and turned off under the action of low potential. An active layer (semiconductor layer) of the N-type transistor may be made of indium gallium zinc oxide (IGZO). Compared to an active layer of a transistor made of low-temperature polycrystalline silicon (LTPS) or amorphous silicon (e.g., hydrogenated amorphous silicon), the active layer of IGZO may effectively reduce the size of the transistor as well as a leakage current of the transistor.

Figure 3:
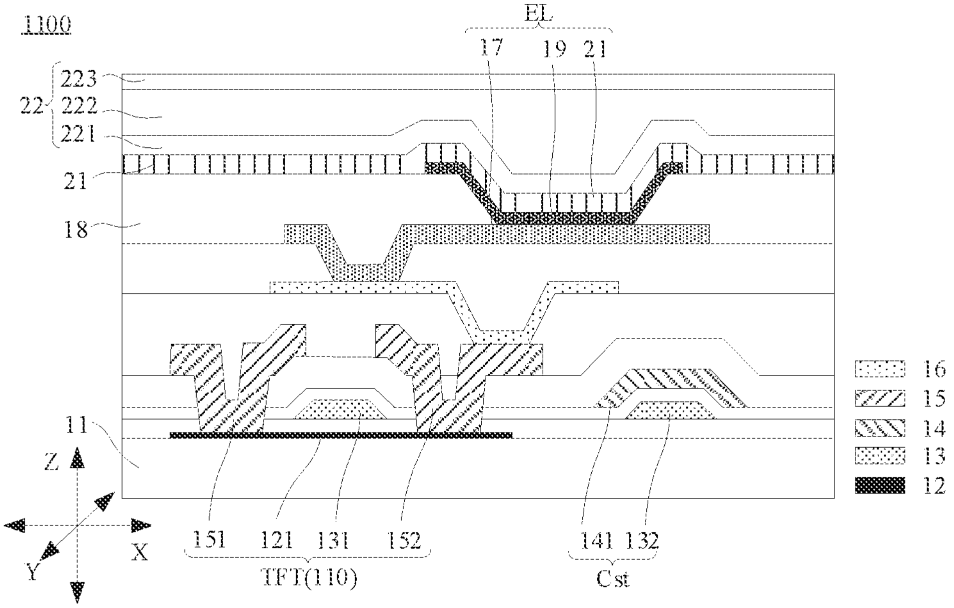
FIG. 3 is a cross-sectional view showing a structure of a display panel, in accordance with some embodiments.

For example, as shown in FIG. 3, the display panel 1100 may include a substrate 11. The display panel 1100 further includes an active layer 12, a first gate conductive layer 13, a second gate conductive layer 14, a first source-drain conductive layer 15, a second source-drain conductive layer 16, anodes 17, a pixel definition layer 18, light-emitting functional layers 19, a cathode layer 21, and an encapsulation layer 22, which are arranged along a direction perpendicular to and away from the substrate 11 (i.e., along a third direction Z). Every two adjacent conductive layers is provided with at least one insulating layer therebetween, which will not be described in detail in the embodiments of the present disclosure. The pixel defining layer 18 may include a plurality of openings, an opening may define a light-emitting region of a sub-pixel P, and at least a portion of a light-emitting functional layer 19 is located within the one opening.

The TFT may include a semiconductor pattern 121 provided in the active layer 12, a gate 131 provided in the first gate conductive layer 13, a source 151 and a drain 152 provided in the first source-drain conductive layer 15. Here, the source 151 and the drain 152 may be symmetrical in structure, i.e., the source 151 and the drain 152 may be structurally indistinguishable. The capacitor Cst may include a first electrode plate 132 provided in the first gate conductive layer 13, and a second electrode plate 141 provided in the second gate conductive layer 14. The light-emitting device EL may include an anode 17, a light-emitting functional layer 19, and a portion of the cathode layer 21.

The encapsulation layer 22 may include a first inorganic material layer 221, an organic material layer 222, and a second inorganic material layer 223 which are stacked in sequence. The first inorganic material layer 221 and the second inorganic material layer 223 can insulate water and oxygen, reduce the erosion of film layer structures below the encapsulation layer 22 (located at a side proximate to the substrate 11) by the external water and oxygen, and in particular reduce the risk of the erosion of the light-emitting functional layer 19 by the water and oxygen, and improve the service life of the display panel 1100. The organic material layer 222 can be used to flatten a light-exit surface of the display panel 1100, and can be used to absorb and release the stress of the display panel 1100.

In related art, OLED display panels may suffer from screen flickering (such as short-term afterimages) when switching between high and low frequency displays. This screen flickering will reduce the display quality of the display apparatus, so improvements are needed to address this problem. It has been found that in the OLED display panels, a channel of a driving transistor (DTFT) in a pixel circuit shows a significant hysteresis effect due to many defect states in the channel. The hysteresis effect of the driving transistor refers to an uncertainty in the electrical characteristics of the driving transistor under a certain bias voltage, i.e., the magnitude of a current of the driving transistor is not only related to the current bias voltage, but also depends on the state of the driving transistor at a previous moment. For example, an image at the previous moment (previous frame period) is often retained in an image displayed at a next moment, resulting in the above-mentioned display problem of screen flickering.

Figure 4A:
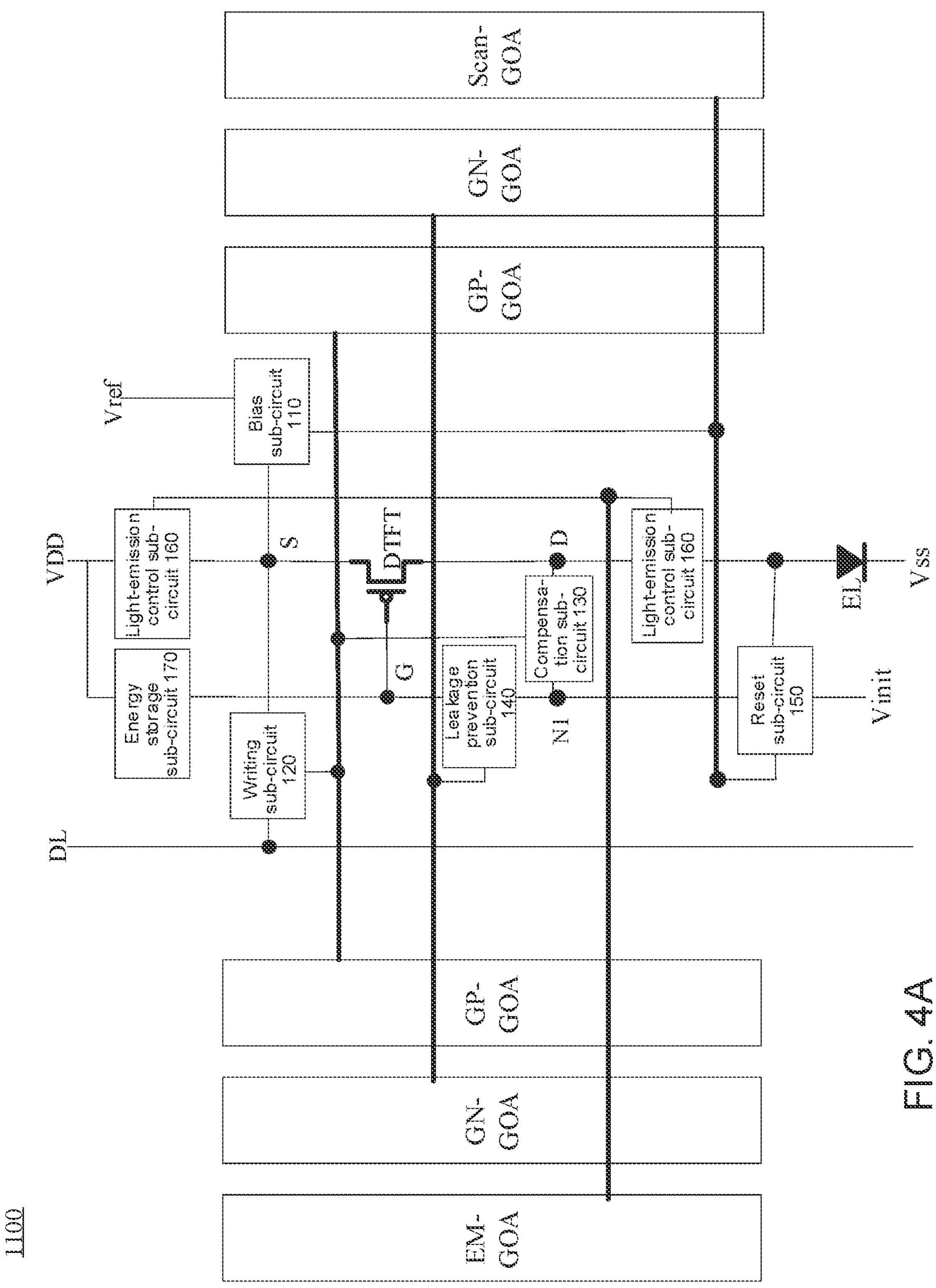
FIG. 4A is a structural diagram of a display panel, in accordance with some embodiments.
Figure 4B:
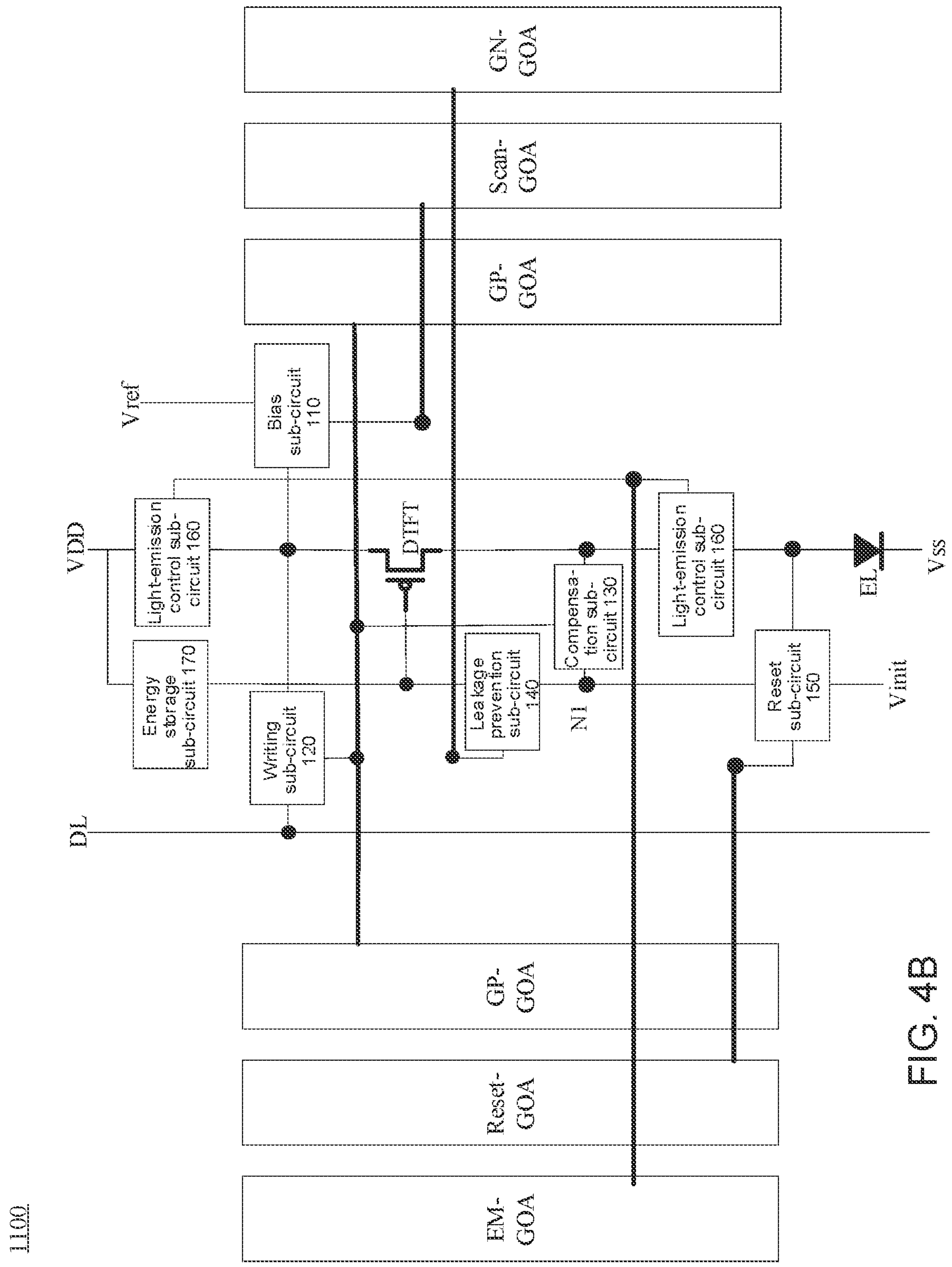
FIG. 4B is a structural diagram of another display panel, in accordance with some embodiments.

In order to solve the above technical problems, some embodiments of the present disclosure provide a display panel 1100. Referring to FIGS. 4A and 4B, the display panel 1100 includes first shift register(s) Scan-GOA, second shift register(s) GP-GOA, third shift register(s) GN-GOA, fourth shift register(s) EM-GOA, and a plurality of pixel circuits 100. Here, only one pixel circuit 100 is exemplarily shown in FIGS. 4A and 4B.

A first shift register Scan-GOA is correspondingly connected to at least one row of pixel circuits 100. The first shift register Scan-GOA is configured to transmit a first scanning signal to the at least one row of pixel circuits 100 correspondingly connected thereto.

For example, referring to FIG. 4A, a first shift register Scan-GOA is correspondingly connected to one row of pixel circuits 100, and the first shift register Scan-GOA is configured to transmit a first scanning signal to the one row of pixel circuits 100 correspondingly connected thereto. Based on this, the load of each first shift register Scan-GOA may be reduced, and the display panel 1100 may be more flexibly controlled for image display.

Figure 5A:
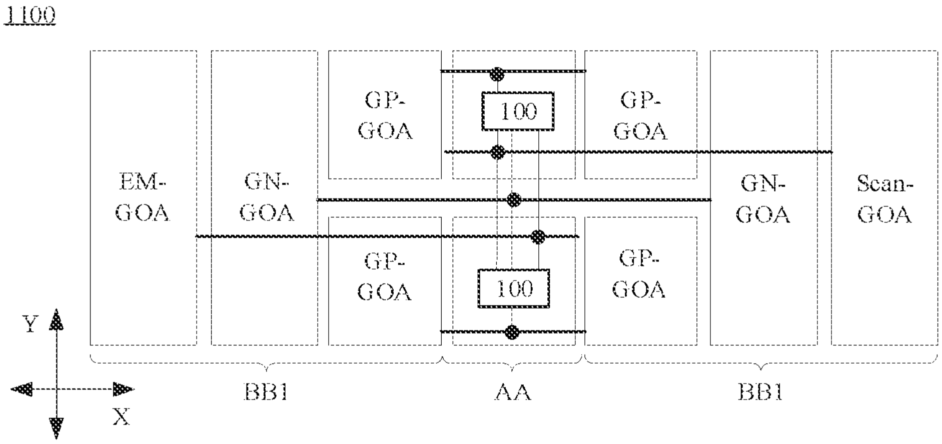
FIG. 5A is a diagram showing an architecture of multiple shift registers, in accordance with some embodiments.

As another example, referring to FIG. 5A, a first shift register Scan-GOA is correspondingly connected to two rows of pixel circuits 100, and the first shift register Scan-GOA is configured to transmit a first scanning signal to the two rows of pixel circuits 100 correspondingly connected thereto. Based on this, the number of the first shift registers Scan-GOA may be reduced and the structure of the display panel 1100 may be simplified. In the embodiments of the present disclosure, there is no specific limit on how many rows of pixel circuits 100 a first shift register Scan-GOA is correspondingly connected to.

As shown in FIG. 4A or FIG. 5A, a second shift register GP-GOA is correspondingly connected to one row of pixel circuits 100, and the second shift register GP-GOA is configured to transmit a second scanning signal to the one row of pixel circuits 100 correspondingly connected thereto. Based on this, data signals may be transmitted to one row of pixel circuits 100 at every time, and the same or different data signals may be transmitted to multiple pixel circuits 100 in the one row through a plurality of data lines DL, so that each sub-pixel P can display the required gray scale, precisely controlling a display state of each sub-pixel P.

A third shift register GN-GOA is correspondingly connected to at least one row of pixel circuits 100, and the third shift register GN-GOA is configured to transmit a third scanning signal to the at least one row of pixel circuits 100 correspondingly connected thereto.

For example, a third shift register GN-GOA may be correspondingly connected to one or more rows of pixel circuits 100, which is not specifically limited in the embodiments of the present disclosure. For example, referring to FIG. 5A, a third shift register GN-GOA is correspondingly connected to two rows of pixel circuits 100, and the third shift register GN-GOA is configured to transmit a third scanning signal to the two rows of pixel circuits 100 correspondingly connected thereto, thereby simplifying the structure of the display panel 1100 as well as a control process of the display panel 1100.

A fourth shift register EM-GOA is correspondingly connected to at least one row of pixel circuits 100, and the fourth shift register EM-GOA is configured to transmit a fourth scanning signal to the at least one row of pixel circuits 100 correspondingly connected thereto.

For example, a fourth shift register EM-GOA may be correspondingly connected to one or more rows of pixel circuits 100, which is not specifically limited in the embodiments of the present disclosure. For example, referring to FIG. 5A, a fourth shift register EM-GOA is correspondingly connected to two rows of pixel circuits 100, and the fourth shift register EM-GOA is configured to transmit a fourth scanning signal to the two rows of pixel circuits 100 correspondingly connected thereto.

Referring to FIG. 4A or FIG. 4B, the pixel circuit 100 may include a driving transistor DTFT, a bias sub-circuit 110, a data writing sub-circuit 120, a compensation sub-circuit 130, a leakage prevention sub-circuit 140, a reset sub-circuit 150, a light-emission control sub-circuit 160, and an energy storage sub-circuit 170.

The bias sub-circuit 110 is electrically connected to a first shift register Scan-GOA, a reference voltage terminal Vref and a source S (a first electrode) of the driving transistor DTFT. The bias sub-circuit 110 is configured to, under the control of a first scanning signal output from the first shift register Scan-GOA, transmit a reference voltage from the reference voltage terminal Vref to the source S of the driving transistor DTFT.

For example, the reference voltage provided by the reference voltage terminal Vref may be a positive voltage. For example, the reference voltage may range from 1V to 8V.

The data writing sub-circuit 120 is electrically connected to a second shift register GP-GOA, a data signal terminal DL and the source S of the driving transistor DTFT. The data writing sub-circuit 120 is configured to, under the control of a second scanning signal from the second shift register GP-GOA, transmit a data signal from the data signal terminal DL to the source S of the driving transistor DTFT.

It can be understood that each data line DL, which serves as a data signal terminal DL, is electrically connected to a column of pixel circuits 100. That is, the data line and the data signal terminal may be considered as different expressions of the same structure, therefore, for ease of illustration, the data line and the data signal terminals bear the same reference character "DL".

The compensation sub-circuit 130 is electrically connected to the second shift register GP-GOA, a drain D of the driving transistor DTFT and a first node N1. The compensation sub-circuit 130 is configured to, under the control of the second scanning signal from the second shift register GP-GOA, transmit a compensated data signal to the first node N1.

The leakage prevention sub-circuit 140 is electrically connected to a third shift register GN-GOA, the first node N1 and a gate G of the driving transistor DTFT. The leakage prevention sub-circuit 140 is configured to be turned on, under the control of a third scanning signal from the third shift register GN-GOA, to cause a connection to be formed between the first node N1 and the gate G of the driving transistor DTFT.

The reset sub-circuit 150 is electrically connected to the first node N1 and a light-emitting device EL electrically connected to the pixel circuit 100, and is configured to reset a voltage of the first node N1 and a voltage of the light-emitting device EL.

FIG. 4A is a structural diagram of the display panel 1100 in which the reset sub-circuit 150 is correspondingly connected to the first shift register Scan-GOA. For example, as shown in FIG. 4A, the reset sub-circuit 150 is further electrically connected to an initial voltage terminal Vinit and the first shift register Scan-GOA, so that the reset sub-circuit 150 is configured to, under the control of the first scanning signal from the first shift register Scan-GOA, transmit an initial voltage from the initial voltage terminal Vinit to the first node N1 and the light-emitting device EL, so as to reset the voltages of the first node N1 and the light-emitting device EL. In this way, the number of shift registers may be reduced, thereby simplifying the structure of the display panel 1100.

Alternatively, FIG. 4B is an architecture of the display panel 1100 in which the reset sub-circuit 150 is correspondingly connected to a fifth shift register Reset-GOA. As shown in FIG. 4B, the display panel 1100 further includes fifth shift register(s) Reset-GOA, and the reset sub-circuit 150 is further electrically connected to the initial voltage terminal Vinit and a fifth shift register Reset-GOA. The reset sub-circuit 150 is configured to, under the control of a fifth scanning signal from the fifth shift register Reset-GOA, transmit the initial voltage from the initial voltage terminal Vinit to the first node N1 and the light-emitting device EL, so as to reset the voltages of the first node N1 and the light-emitting device EL. In this way, the bias sub-circuit 110 and the reset sub-circuit 150 can be controlled separately, and the control method of the display panel 1100 is more flexible.

Figure 6A:
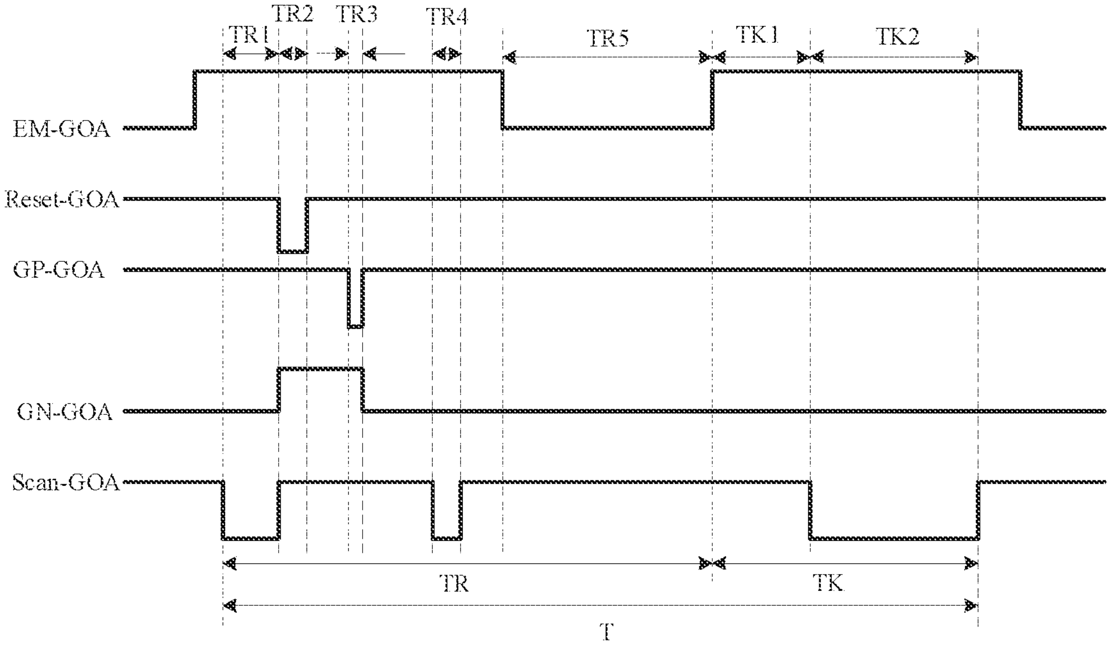
FIG. 6A is a diagram showing signals output from multiple shift registers, in accordance with some embodiments.

As shown in FIG. 6A, in a case where the display panel 1100 includes the fifth shift register Reset-GOA, the fifth scanning signal output from the fifth shift register Reset-GOA and the first scanning signal output from the first shift register Scan-GOA are different scanning signals (shown in the figure as two folded lines with different fluctuation states). For example, in a first bias phase TR1 (refer to the following), the first shift register Scan-GOA outputs the first scanning signal, which means that the first scanning signal output from the first shift register Scan-GOA has an effective level (e.g., a low level) in this phase, and the fifth shift register Reset-GOA does not output the fifth scanning signal, which means that the fifth scanning signal has an ineffective level (e.g., a null level) in this phase; and in a reset phase TR2 (refer to the following), the first shift register Scan-GOA does not output the first scanning signal, which means that the first scanning signal has an ineffective level (e.g., a null level) in this phase, and the fifth shift register Reset-GOA outputs the fifth scanning signal, which means that the fifth scanning signal output from the fifth shift register Reset-GOA has an effective level (e.g., a low level) in this phase.

Continuing to refer to FIGS. 4A and 4B, the light-emission control sub-circuit 160 is electrically connected to the fourth shift register EM-GOA, a first voltage signal terminal VDD, the driving transistor DTFT and the light-emitting device EL. The light-emission control sub-circuit 160 is configured to, under the control of the fourth scanning signal from the fourth shift register EM-GOA, cause a path to be formed between the driving transistor DTFT and the light-emission control sub-circuit 160, so as to transmit a driving current to the light-emitting device EL.

For example, the light-emission control sub-circuit 160 may include two portions. One portion of the light-emission control sub-circuit 160 is electrically connected to the fourth shift register EM-GOA, the first voltage signal terminal VDD and the source S of the driving transistor DTFT, and is configured to, under the control of the fourth scanning signal output from the fourth shift register EM-GOA, transmit a first voltage from the first voltage signal terminal VDD to the source S of the driving transistor DTFT. As a result, the driving transistor DTFT generates a driving current due to the action of the voltage of the gate G thereof and the voltage of the source S thereof. The other portion of the light-emission control sub-circuit 160 is electrically connected to the fourth shift register EM-GOA, the drain D of the driving transistor DTFT and the light-emitting device EL, and is configured to, under the control of the fourth scanning signal output from the fourth shift register EM-GOA, transmit the driving current generated by the driving transistor DTFT to the light-emitting device EL. As a result, the light-emitting device 11 emits light due to the driving current.

Based on the structure of the pixel circuit 100 described above, referring to FIGS. 6A and 6B, a frame period T may include a refresh frame period TR. The refresh frame period TR includes a first bias phase TR1, a reset phase TR2 after the first bias phase TR1, a data writing phase TR3 after the reset phase TR2, a second bias phase TR4 after the data writing phase TR3, and a light-emitting phase TR5 after the second bias phase TR4.

For example, referring to FIG. 6A, the display panel 1100 further includes fifth shift register(s) Reset-GOA, and the reset sub-circuit 150 is electrically connected to a fifth shift register Reset-GOA. In this case, the first shift register Scan-GOA is configured to output the first scanning signal in the first bias phase TR1 and the second bias phase TR4;

the second shift register GP-GOA is configured to output the second scanning signal in the data writing phase TR3; the third shift register GN-GOA is configured to output the third scanning signal in the reset phase TR2 and the data writing phase TR3; the fourth shift register EM-GOA is configured to output the fourth scanning signal in the light-emitting phase TR5; and the fifth shift register Reset-GOA is configured to output a fifth scanning signal in the reset phase TR2.

Figure 6B:
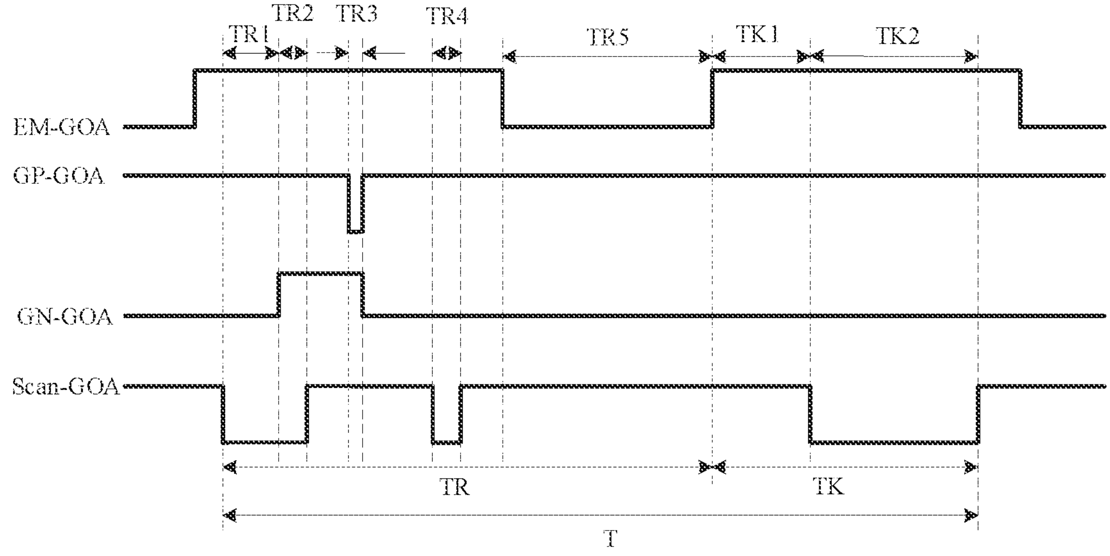
FIG. 6B is another diagram showing signals output from multiple shift registers, in accordance with some embodiments.

As another example, referring to FIG. 6B, the reset sub-circuit 150 is electrically connected to the first shift register Scan-GOA, that is, the display panel 1100 does not include the fifth shift register Reset-GOA. In this case, the first shift register Scan-GOA is configured to output the first scanning signal in the first bias phase TR1, the reset phase TR2 and the second bias phase TR4; the second shift register GP-GOA is configured to output the second scanning signal in the data writing phase TR3; the third shift register GN-GOA is configured to output the third scanning signal in the reset phase TR2 and the data writing phase TR3; and the fourth shift register EM-GOA is configured to output the fourth scanning signal in the light-emitting phase TR5.

In a first bias phase TR1 of the current frame, the first shift register Scan-GOA outputs a first scanning signal, and the bias sub-circuit 110, under the control of the first scanning signal, transmits a reference voltage from the reference voltage terminal Vref to the source S of the driving transistor DTFT. In this case, a voltage of the gate G of the driving transistor DTFT is a compensated data signal (Vdata+Vth) written in the previous frame, and a voltage difference between the gate G of the driving transistor DTFT and the source S thereof is Vgs, in which Vgs=Vdata+Vth−Vref (where Vref represents the reference voltage provided from the reference voltage terminal Vref). As a result, the driving transistor DTFT is in a biased state. At the beginning of each frame (the first bias phase TR1), driving transistors DTFT are all in a saturated bias state, so that when the display panel 1100 displays images, the driving transistors DTFT are all changed from the above biased state to a corresponding display state, and the data voltage (Vdata+Vth) of an image displayed by the display panel 1100 in the current frame is not affected by the data voltage of an image displayed by the display panel 1100 in the previous frame, thereby ameliorating the problem of the short-term afterimages due to the hysteresis effect, and improving the display quality of the display panel 1100. Moreover, as compared to transmitting the reference voltage to the source S of the driving transistor DTFT in the reset phase TR2, transmitting the reference voltage to the source S of the driving transistor DTFT in the first bias phase TR1 (before the reset phase TR2) can increase the voltage difference Vgs between the gate G of the driving transistor DTFT and the source S thereof, and thereby causing the driving transistor DTFT to be in the saturated biased state and to quickly be out of the hysteresis state of the driving transistor DTFT.

It can be understood that for the above-described pixel circuit 100 provided in the embodiments of the present disclosure, the reference voltage is transmitted to the source S of the driving transistor DTFT in the second bias phase TR4, and the voltage difference Vgs between the gate G and the source of the driving transistor DTFT is equal to the compensated data voltage (Vdata+Vth) written in the current frame minus the reference voltage Vref of the source S of the driving transistor DTFT. In this way, the driving transistor DTFT can be in the biased state, ameliorating the hysteresis characteristics of the driving transistor DTFT, reducing the influence on a display phase (i.e., the light-emitting phase hereinbefore) TR5 due to the hysteresis phenomenon of the driving transistor DTFT appearing in the data writing phase TR3, and further improving the display quality of the display panel 1100.

In some embodiments, referring to FIGS. 6A and 6B, a frame period of display may further include a hold frame period TK after the refresh frame period TR. The hold frame period TK may include a black insertion phase TK1 and a third bias phase TK2 after the black insertion phase TK1.

As shown in FIG. 6A, in the black insertion phase TK1, the fourth shift register EM-GOA does not output the fourth scanning signal, which means that the fourth scanning signal has an ineffective level (e.g., a null level) in this phase. In this case, the light-emission control sub-circuit 160 switches off the driving current flowing through the driving transistor DTFT, so the light-emitting device EL displays as black (0 grayscale). In the third bias phase TK2, the gate G of the driving transistor DTFT maintains the voltage in the previous phase (the compensated data voltage written in the data writing phase TR3), and the bias sub-circuit 110 transmits the reference voltage to the source S of the driving transistor DTFT, so the driving transistor DTFT is in the biased state.

In some embodiments, when displaying image information, the display apparatus 1000 may have at least two refresh rates. For example, the display apparatus 1000 may have a first refresh rate and a second refresh rate, where the first refresh rate is greater than the second refresh rate. At the first refresh rate, a frame may include only the refresh frame period TR; and at the second refresh rate, a frame may include the refresh frame period TR and the hold frame period TK. It can be understood that the display apparatus 1000 may have multiple refresh rates, and different refresh rates may be implemented by controlling the length of the holding frame period TK, which is not specifically limited in the embodiments of the present disclosure.

Figure 7:
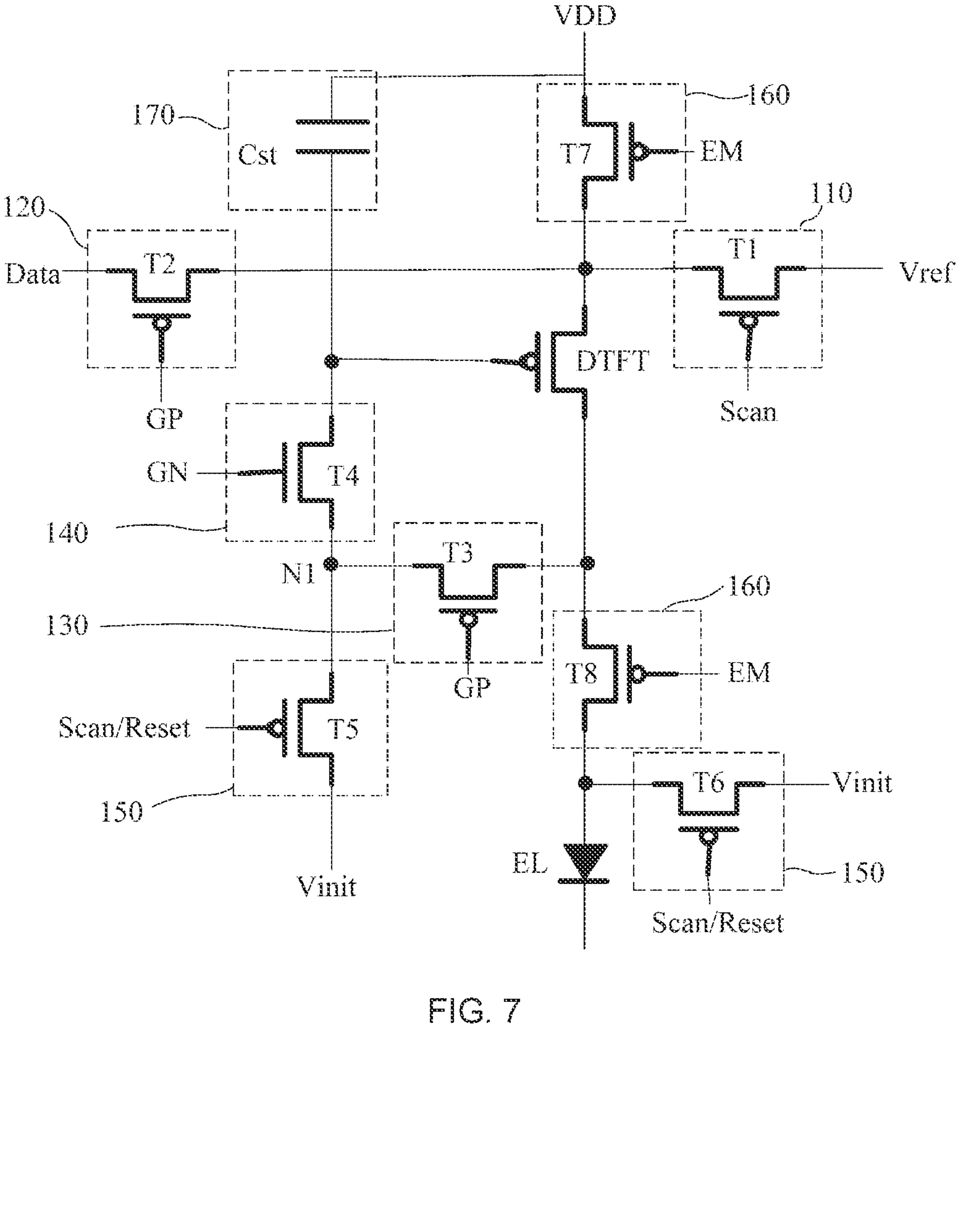
FIG. 7 is an equivalent circuit diagram of a pixel circuit, in accordance with some embodiments.
Figure 8:
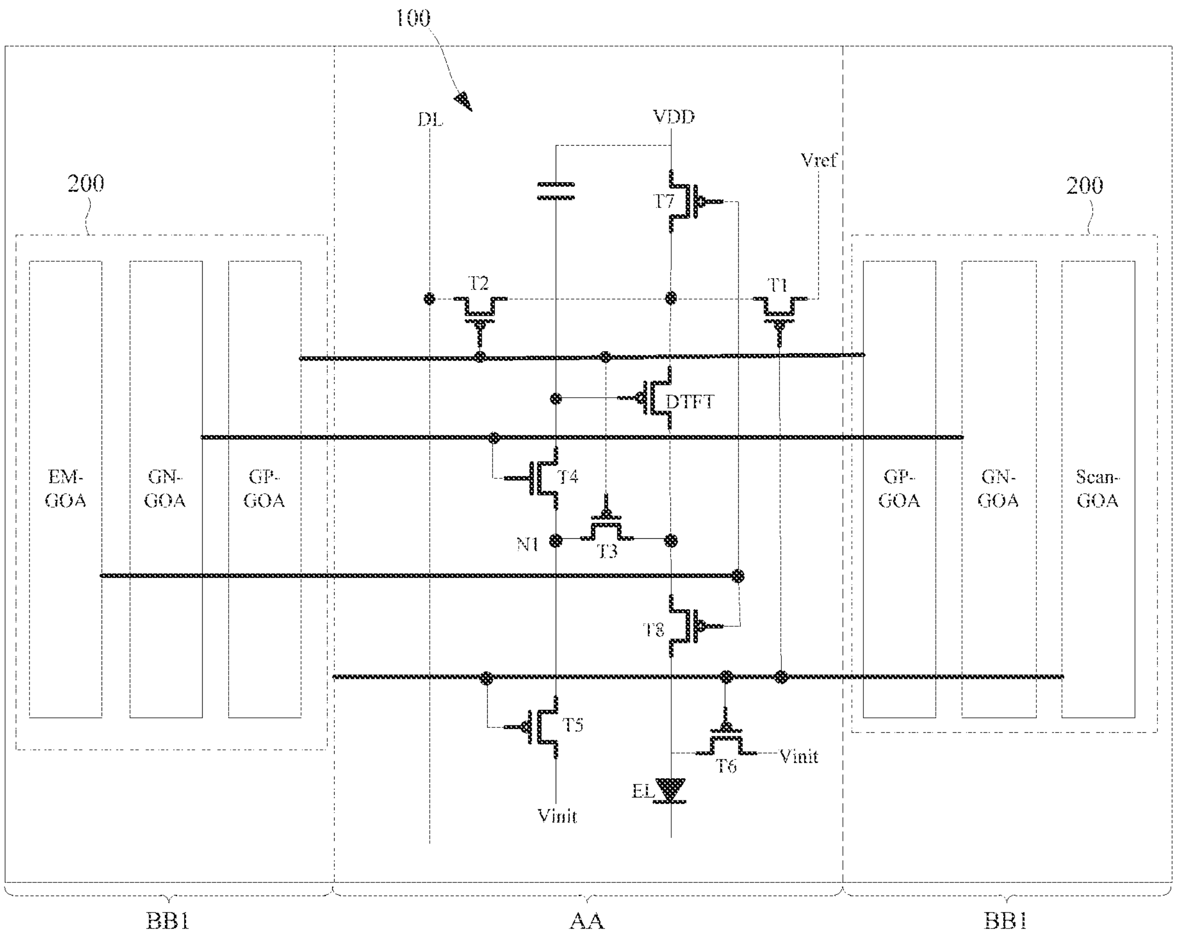
FIG. 8 is a structural diagram of still another display panel, in accordance with some embodiments.

In some embodiments, referring to FIGS. 7 and 8, FIG. 7 is an equivalent circuit diagram of a pixel circuit 100, and FIG. 8 is a diagram showing a connection relationship between the pixel circuit and multiple shift registers. It will be appreciated that a corresponding shift register is replaced with a respective scanning signal terminal in FIG. 7. For example, a first scanning signal terminal Scan is used in place of a first shift register, a second scanning signal terminal GP is used in place of a second shift register, and so on, which will not be enumerated herein.

The bias sub-circuit 110 includes a first transistor T1. Of the first transistor T1, a control electrode (a gate) is electrically connected to a first shift register (a first scanning signal terminal Scan), a first electrode (a source) is electrically connected to a reference voltage terminal Vref, and a second electrode is electrically connected to a source (a first electrode) S of the driving transistor DTFT.

The data writing sub-circuit 120 includes a second transistor T2. Of the second transistor T2, a control electrode is electrically connected to a second shift register (a second scanning signal terminal GP), a first electrode is electrically connected to a data signal terminal DL (represented with "Data" in FIG. 7), and a second electrode is electrically connected to the source S of the driving transistor DTFT.

The compensation sub-circuit 130 includes a third transistor T3. Of the third transistor T3, a control electrode is electrically connected to the second shift register, a first electrode is electrically connected to a drain of the driving transistor DTFT, and a second electrode is electrically connected to the first node N1.

The leakage prevention sub-circuit 140 includes a fourth transistor T4. Of the fourth transistor T4, a control electrode is electrically connected to a third shift register (a third scanning signal terminal GN), a first electrode is electrically connected to the first node N1, and a second electrode is electrically connected to a gate G of the driving transistor DTFT.

The reset sub-circuit 150 includes a fifth transistor T5 and a sixth transistor T6.

The reset sub-circuit 150 is electrically connected to the first shift register. In this case, of the fifth transistor T5, a control electrode is electrically connected to the first shift register, a first electrode is electrically connected to an initial voltage terminal Vinit, a second electrode is electrically connected to the first node N1; and of the sixth transistor T6, a control electrode is electrically connected to the first shift register, a first electrode is electrically connected to the initial voltage terminal Vinit, and a second electrode is electrically connected to the light-emitting device EL.

The display panel 1100 further includes fifth shift register(s) Reset-GOA, and the reset sub-circuit 150 is further electrically connected to a fifth shift register (a fifth scanning signal terminal Reset). In this case, of the fifth transistor T5, a control electrode is electrically connected to the fifth shift register, a first electrode is electrically connected to an initial voltage terminal Vinit, a second electrode is electrically connected to the first node N1; and of the sixth transistor T6, a control electrode is electrically connected to the fifth shift register, a first electrode is electrically connected to the initial voltage terminal Vinit, and a second electrode is electrically connected to the light-emitting device EL.

The light-emission control sub-circuit 160 includes a seventh transistor T7 and an eighth transistor T8. Of the seventh transistor T7, a control electrode is electrically connected to the fourth shift register (the fourth scanning signal terminal EM), a first electrode is electrically connected to the first voltage signal terminal VDD, a second electrode is electrically connected to the source S of the driving transistor DTFT. Of the eighth transistor T8, a control electrode is electrically connected to the fourth shift register, a first electrode is electrically connected to the drain of the driving transistor DTF, and a second electrode is electrically connected to the light-emitting device EL.

The energy storage sub-circuit 170 includes a first capacitor Cst, of which a first electrode plate is electrically connected to the gate G of the driving transistor DTFT, and a second electrode plate is electrically connected to a constant voltage terminal. For example, the second electrode plate of the first capacitor Cst may be electrically connected to the first voltage terminal VDD. The first capacitor Cst is configured to maintain a voltage of the gate G of the driving transistor DTFT.

In some embodiments, referring to FIG. 7, the fourth transistor T4 included in the leakage prevention sub-circuit 140 may be an N-type transistor using IGZO as an active layer of the transistor. In this way, it is beneficial to reduce the leakage current at the gate G of the driving transistor DTFT. The remaining transistors (the first to eighth transistors) may all be P-type transistors.

It will be appreciated that in the embodiments of the present disclosure, specific implementations of the bias sub-circuit 110, the data writing sub-circuit 120, the compensation sub-circuit 130, the leakage prevention sub-circuit 140, the reset sub-circuit 150, and the light-emission control sub-circuit 160, and the energy storage sub-circuit 170 are not limited to the above-described manner, and any of which may have an arbitrarily-used implementation, such as a general connection method well known to the skilled persons of the field, which is just sufficient to ensure the realization of a corresponding function. The above examples are not intended to limit the protection scope of the present disclosure. In practical applications, those skilled in the art may choose to use or not to use one or more of the above circuits according to the situations, and variations based on various combinations of the above circuits do not depart from the principle of the present disclosure, which will not be described in detail herein.

In some embodiments, referring to FIG. 8, which is a diagram showing a corresponding connection relationship between the pixel circuit as shown in FIG. 7 and multiple shift registers (the first to fourth shift registers), a row of pixel circuits 100 has opposite two sides BB1 along the first direction X. That is, the peripheral region BB includes portions located at both sides of the plurality of pixel circuits 100 along the first direction X. The first direction X is a direction in which the row of pixel circuits 100 is arranged. In the embodiments of the present disclosure, unless otherwise specified, "two sides" refers to both sides of a row of pixel circuits 100 along the first direction X. It can be understood that the "first to fourth shift registers" include a first shift register, a second shift register, a third shift register and a fourth shift register. In the embodiments of the present disclosure, the "first to $X^{th}$ items A" include a plurality of items A, the number of which is "X", and the X items A are numbered as "first", "second", . . . , and "$X^{th}$", respectively.

Referring to FIGS. 5A to 5D, at least one of a first shift register Scan-GOA and a third shift register GN-GOA is located at one side BB1 of the two sides BB1. That is, at least one of the first shift register Scan-GOA and the third shift register GN-GOA adopts a single-side driving (also called a unilateral driving). In this way, it is beneficial to reduce the width of the peripheral area BB of the display panel 1100 and to achieve a narrow bezel of the display panel 1100.

In embodiments of the present disclosure, a row of pixel circuits 100 is correspondingly connected to two second shift registers GP-GOA. One of the second shift registers GP-GOA is located at one side BB1 of opposite two sides BB1 of the row of pixel circuits 100 along the first direction X, and adjacent to the row of pixel circuits 100; and the other one of the second shift registers GP-GOA is located at the other side of the opposite two sides BB1 of the row of pixel circuits 100 along the first direction X, and adjacent to the row of pixel circuits 100. That is, the second shift registers GP-GOA adopt a double-side driving, and each of the second shift registers GP-GOA is closer to the row of pixel circuits 100 (closer to the display area AA) than other shift registers at the same side in the two sides BB1. This facilitates the reduction of the voltage drop generated on the scanning signal line GL by the second scanning signal output from the second shift register GP-GOA, so that the data writing sub-circuit 120 and the compensation sub-circuit 130 can be fully turned on in the data writing phase TR3, enhancing the speed of the writing of the data signal of the display panel 1100, and enhancing the accuracy of the writing of the data voltage of the gate G of the driving transistor DTFT.

It can be understood that, taking a first shift register Scan-GOA as an example, the first shift register Scan-GOA adopts a single-side driving, which means that a row of pixel circuits 100 is electrically connected to the first shift register Scan-GOA, and the first shift register Scan-GOA is located at one side BB1 of two sides BB1. First shift registers adopt a double-side driving, which means that a row of pixel circuits 100 is electrically connected to two first shift registers Scan-GOA, one of the first shift registers Scan- GOA is located at one side BB1 of two sides BB1, and the other one of the first shift registers Scan-GOA is located at the other side BB1 of the two sides BB1. In embodiments of the present disclosure, in a case where other shift registers (the second to fifth shift registers) are described as adopting a single-side driving or double-side driving, this configuration has a similar meaning as the above-mentioned first register adopting a single-side driving or double-side driving, and the embodiments of the present disclosure will not be repeated one by one.

For example, referring to FIG. 5A, for two sides BB1 of a row of pixel circuits 100 along the first direction X, one side BB1 of the two sides BB1 may be provided with a first shift register Scan-GOA, and each side BB1 of the two sides BB1 may be provided with a third shift register GN-GOA. That is, the first shift register Scan-GOA adopts a single-side driving, and the third shift registers GN-GOA adopt a double-side driving. Alternatively, referring to FIG. 5B, each side BB1 of the two sides BB1 may be provided with a first shift register Scan-GOA, and each side BB1 of the two sides BB1 may be provided with a third shift register GN-GOA. That is, the first shift register Scan-GOA adopts a double-side driving, and the third shift registers GN-GOA adopt a double-side driving. Alternatively, referring to FIGS. 5C and 5D, one side BB1 of the two sides BB1 may be provided with both a first shift register Scan-GOA and a third shift register GN-GOA. That is, the first shift register Scan-GOA and the third shift register GN-GOA both adopt a single-side driving.

In some embodiments, as shown in FIG. 5A, in a case where the reset sub-circuit 150 is electrically connected to a first shift register Scan-GOA, a row of pixel circuits 100 may be correspondingly connected to one first shift register Scan-GOA, two third shift registers GN-GOA and one fourth shift register EM-GOA. That is, the first shift register Scan-GOA and the fourth shift register EM-GOA adopt a single-side driving, and the second shift registers GP-GOA and the third shift registers GN-GOA adopt a double-side driving. In this way, the power consumption of the third shift register GN-GOA may be reduced, and the rising delay and falling delay of the third scanning signal may be reduced.

For example, as shown in FIG. 5A, a fourth shift register EM-GOA and one of third shift registers GN-GOA are located at one side BB1 of two sides BB1, and a first shift register Scan-GOA and the other of the third shift registers GN-GOA are located at the other side BB1 of the two sides BB1. In this way, the number of shift registers on two sides BB1 of a row of pixel circuits 100 along the first direction X may be balanced (the two sides BB1 each are provided with three shift registers), so that the widths of portions of the peripheral area on the two sides BB1 are approximately equal, and the arrangement of the wiring of the peripheral area BB is facilitated.

In some embodiments, as shown in FIG. 5A, a fourth shift register EM-GOA is further away from a row of pixel circuits 100 than a third shift register GN-GOA located at the same side as the fourth shift register EM-GOA (further away from the display area AA), and a first shift register Scan-GOA is further away from the row of pixel circuits 100 than a third shift register GN-GOA located at the same side as the first shift register Scan-GOA, thereby optimizing the wiring space of the display panel 1100.

Figure 5B:
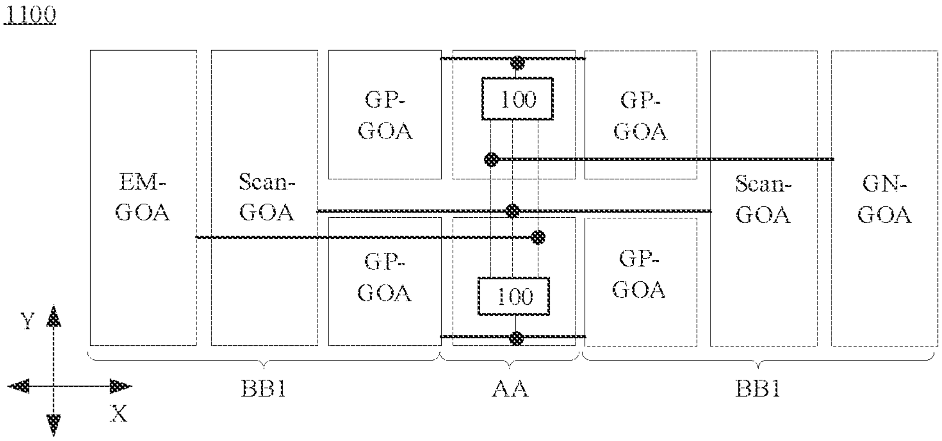
FIG. 5B is a diagram showing another architecture of multiple shift registers, in accordance with some embodiments.

In some other embodiments, as shown in FIG. 5B, in a case where the reset sub-circuit 150 is electrically connected to a first shift register Scan-GOA, a row of pixel circuits 100 may be correspondingly connected to one third shift register GN-GOA, two first shift registers Scan-GOA and one fourth shift register EM-GOA. That is, the third shift register GN-GOA and the fourth shift register EM-GOA adopt a single-side driving; and the first shift registers Scan-GOA and the second shift registers GP-GOA adopt a double-side driving. In this way, the power consumption of the first shift register Scan-GOA may be reduced, and the rising delay and falling delay of the first scanning signal may be reduced.

For example, as shown in FIG. 5B, a fourth shift register EM-GOA and one of first shift registers Scan-GOA are located at one side of two sides BB1, and a third shift register GN-GOA and the other of the first shift registers Scan-GOA are located at the other side of the two sides BB1. In this way, the number of shift registers on two sides BB1 of a row of pixel circuits 100 along the first direction X may be balanced (the two sides BB1 each are provided with three shift registers), so that the widths of portions of the peripheral area on the two sides BB1 are approximately equal, and the arrangement of the wiring of the peripheral area BB is facilitated.

In some embodiments, as shown in FIG. 5B, a fourth shift register EM-GOA is further away from a row of pixel circuits 100 than a first shift register Scan-GOA located at the same side as the fourth shift register EM-GOA (further away from the display area AA), and a third shift register GN-GOA is further away from the row of pixel circuits 100 than a first shift register Scan-GOA located at the same side as the third shift register GN-GOA (further away from the display area AA).

Figure 5C:
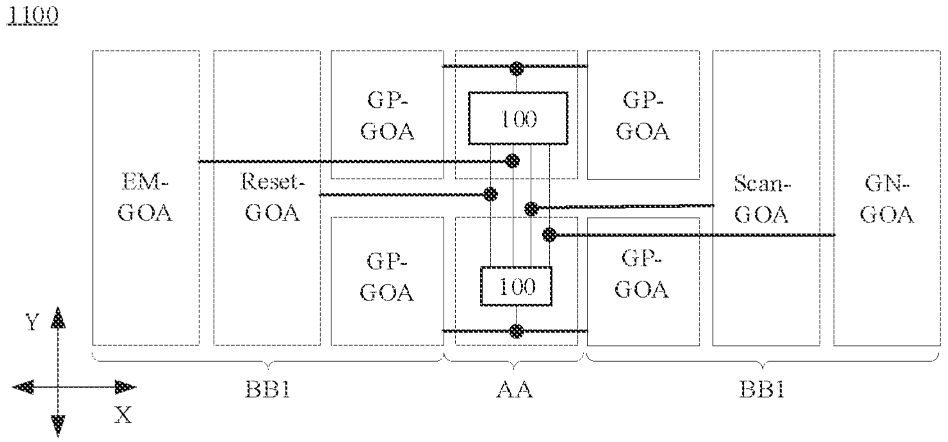
FIG. 5C is a diagram showing still another architecture of multiple shift registers, in accordance with some embodiments.

In yet some other embodiments, as shown in FIG. 5C, in a case where the display panel 1100 further includes fifth shift register(s) Reset-GOA, a row of pixel circuits 100 may be electrically connected to one first shift register Scan-GOA, one third shift register GN-GOA, one fourth shift register EM-GOA and one fifth shift register Reset-GOA. That is, the first shift register Scan-GOA, the third shift register GN-GOA, the fourth shift register EM-GOA and the fifth shift register Reset-GOA each adopt a single-side driving, and the second shift register GP-GOA adopts a double-side driving.

In some embodiments, for two sides BB1 of a row of pixel circuits 100 along the first direction X, one side is provided with two of a first shift register Scan-GOA, a third shift register GN-GOA, a fourth shift register EM-GOA, and a fifth shift register Reset-GOA, the other side is provided with the other two of the first shift register Scan-GOA, the third shift register GN-GOA, the fourth shift register EM-GOA, and the fifth shift register Reset-GOA. That is, the two sides BB1 of the row of pixel circuits 100 along the first direction X each provided with respective two of the above four shift registers. In this way, the number of shift registers on two sides BB1 of a row of pixel circuits 100 along the first direction X may be balanced, so that the widths of portions of the peripheral area on the two sides BB1 are approximately equal, and the arrangement of the wiring of the peripheral area BB is facilitated.

For example, as shown in FIG. 5C, a fourth shift register EM-GOA and a fifth shift register Reset-GOA are located at one side of two sides, and the fourth shift register EM-GOA is further away from a row of pixel circuits 100 than the fifth shift register Reset-GOA (further away from the display area AA); a first shift register Scan-GOA and a third shift register GN-GOA are located at the other side BB1 of the two sides BB1, and the third shift register GN-GOA is further away from the row of pixel circuits 100 than the first shift register Scan-GOA.

In some embodiments, in a case where the display panel 1100 further includes fifth shift register(s) Reset-GOA, as shown in FIG. 5C, each fifth shift register Reset-GOA may be electrically connected to two rows of pixel circuits 100. That is to say, the fifth shift register Reset-GOA adopts a double-electrode driving, which is beneficial to reducing the number of fifth shift registers Reset-GOA and simplifying the processing difficulty of the fifth shift registers Reset-GOA.

Figure 5D:
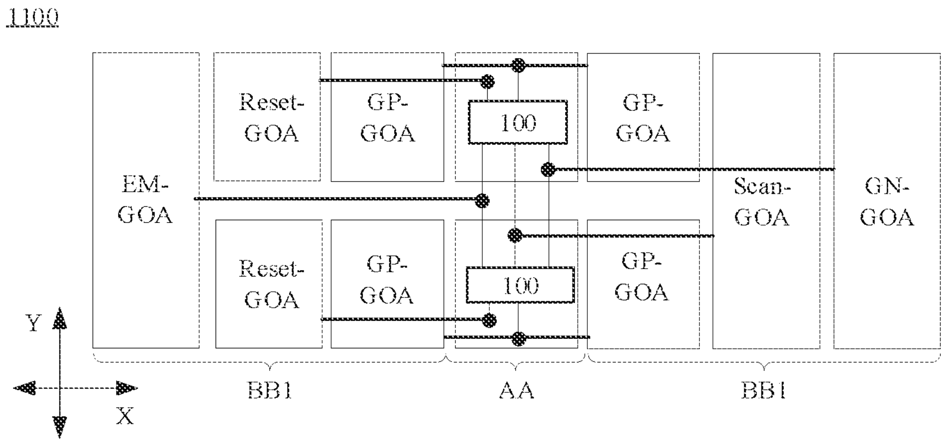
FIG. 5D is a diagram showing yet another architecture of multiple shift registers, in accordance with some embodiments.

Alternatively, in some other embodiments, as shown in FIG. 5D, each fifth shift register Reset-GOA may be electrically connected to one row of pixel circuits 100. That is to say, the fifth shift register Reset-GOA adopts a single-electrode driving, which is beneficial to reducing the load of each fifth shift register Reset-GOA, and reducing the rising delay and falling delay of the fifth scanning signal.

In some embodiments, the first shift register Scan-GOA, the third shift register GN-GOA and the fourth shift register EM-GOA each adopt a double-electrode driving, and the second shift register GP-GOA adopts a single-electrode driving. It can be understood that in some other embodiments, one or more of the first shift register Scan-GOA, the third shift register GN-GOA and the fourth shift register EM-GOA may also adopt a single-electrode driving and the embodiments of the present disclosure will not be enumerated.

In some embodiments, the first shift register Scan-GOA, the third shift register GN-GOA, and the fourth shift register EM-GOA each include a "12T3C" circuit, and the second shift register GP-GOA includes an "8T2C" circuit. It will be appreciated that "T" represents a TFT, the number preceding "T" represents the number of TFTs, "C" represents a capacitor, and the number preceding "C" represents the number of capacitors. That is, the first shift register Scan-GOA, the third shift register GN-GOA, and the fourth shift register EM-GOA each include twelve TFTs and three capacitors; and the second shift register GP-GOA includes eight TFTs and two capacitors.

In a case where the display panel 1100 further includes fifth shift register(s) Reset-GOA, a fifth shift register Reset-GOA may also include an "8T2C" circuit. And the fifth shift register Reset-GOA and the second shift register GP-GOA may adopt circuits with the same structure, which is beneficial to simplifying the structure of the display panel 1100 and reducing the manufacturing difficulty of the display panel 1100.

Figure 9:
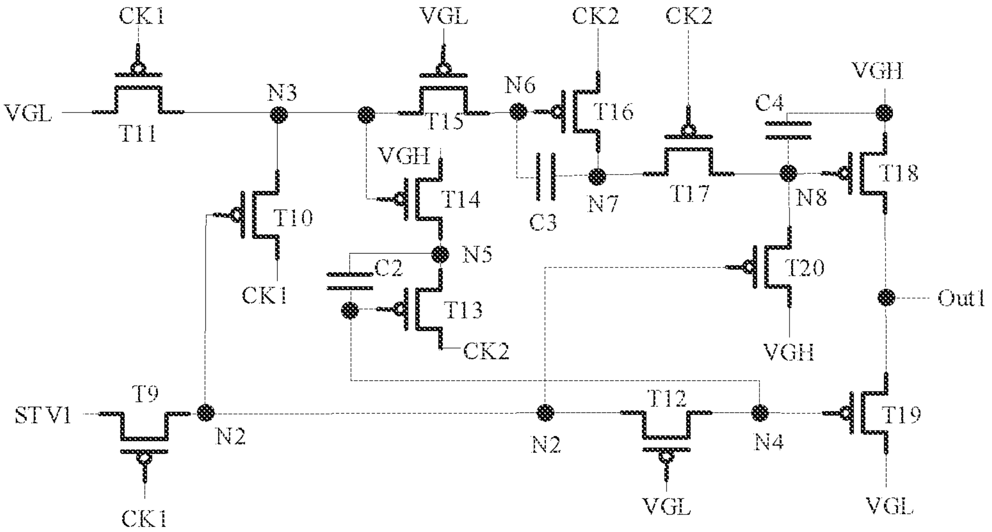
FIG. 9 is an equivalent circuit diagram of a "12T3C" circuit, in accordance with some embodiments.

For example, embodiments of the present disclosure provide a "12T3C" circuit of an equivalent circuit diagram shown in FIG. 9, in which all transistors are exemplified by P-type transistors. The "12T3C" circuit may include a ninth transistor T9, a tenth transistor T10, an eleventh transistor T11, a twelfth transistor T12, a thirteenth transistor T13, a fourteenth transistor T14, a fifteenth transistor T15, a sixteenth transistor T16, a seventeenth transistor T17, an eighteenth transistor T18, a nineteenth transistor T19, and a twentieth transistor T20. The "12T3C" circuit further includes a second capacitor C2, a third capacitor C3, and a fourth capacitor C4.

For example, of the ninth transistor T9, a control electrode is electrically connected to a first clock signal terminal CK1, a first electrode is electrically connected to a first start signal terminal STV1, and a second electrode is electrically connected to a second node N2.

It can be understood that the display panel 1100 includes a plurality of shift registers connected in sequence. The first start signal terminal STV1 electrically connected to a shift register at the first-stage may transmit a start signal output from a start signal line; a start signal terminal STV1 electrically connected to other shift registers (shift registers at a current-stage) other than the shift register at the first-stage may transmit a cascade signal output from a shift register at a previous-stage.

Of the tenth transistor T10, a control electrode is electrically connected to a second node N2, a first electrode is electrically connected to a first clock signal terminal CK1, and a second electrode is electrically connected to a third node N3. Of the eleventh transistor T11, a control electrode is electrically connected to the first clock signal terminal CK1, a first electrode is electrically connected to a low-voltage signal terminal VGL, and a second electrode is electrically connected to a third node N3. Of the twelfth transistor T12, a control electrode is electrically connected to the low-voltage signal terminal VGL, a first electrode is electrically connected to the second node N2, and a second electrode is electrically connected to a fourth node N4. Of the thirteenth transistor T13, a control electrode is electrically connected to the fourth node N4, a first electrode is electrically connected to a second clock signal terminal CK2, and a second electrode is electrically connected to a fifth node N5. Of the fourteenth transistor T14, a control electrode is electrically connected to the third node N3, a first electrode is electrically connected to a high-voltage signal terminal VGH, and a second electrode is electrically connected to a fifth node N5. Of the fifteenth transistor T15, a control electrode is electrically connected to the low-voltage signal terminal VGL, a first electrode is electrically connected to the third node N3, and a second electrode is electrically connected to a sixth node N6. Of the sixteenth transistor T16, a control electrode is electrically connected to the sixth node N6, a first electrode is electrically connected to the second clock signal terminal CK2, and a second electrode is electrically connected to a seventh node N7. Of the seventeenth transistor T17, a control electrode is electrically connected to the second clock signal terminal CK2, a first electrode is electrically connected to the seventh node N7, and a second electrode is electrically connected to an eighth node N8. Of the eighteenth transistor T18, a control electrode is electrically connected to the eighth node N8, a first electrode is electrically connected to the high-voltage signal terminal VGH, and a second electrode is electrically connected to a first signal output terminal Out1. Of the nineteenth transistor T19, a control electrode is electrically connected to the fourth node N4, a first electrode is electrically connected to the low-voltage signal terminal VGL, and a second electrode is electrically connected to the first signal output terminal Out1. Of the twentieth transistor T20, a control electrode is electrically connected to the second node N2, a first electrode is electrically connected to the high-voltage signal terminal VGH, and a second electrode is electrically connected to the eighth node N8.

Of the second capacitor C2, a first electrode plate is electrically connected to the fourth node N4, and a second electrode plate is electrically connected to the fifth node N5. Of the third capacitor C3, a first electrode plate is electrically connected to the sixth node N6, and a second electrode plate is electrically connected to the seventh node N7. Of the fourth capacitor C4, a first electrode plate is electrically connected to the high-voltage signal terminal VGH, and a second electrode plate is electrically connected to the eighth node N8.

Here, for any shift register of the first shift register Scan-GOA, the third shift register GN-GOA, and the fourth shift register EM-GOA having the above "12T3C" circuit, a signal terminal in the foregoing description is connected to a corresponding signal line, and a connection of this shift register and the corresponding signal line will be described below.

Figure 10A:
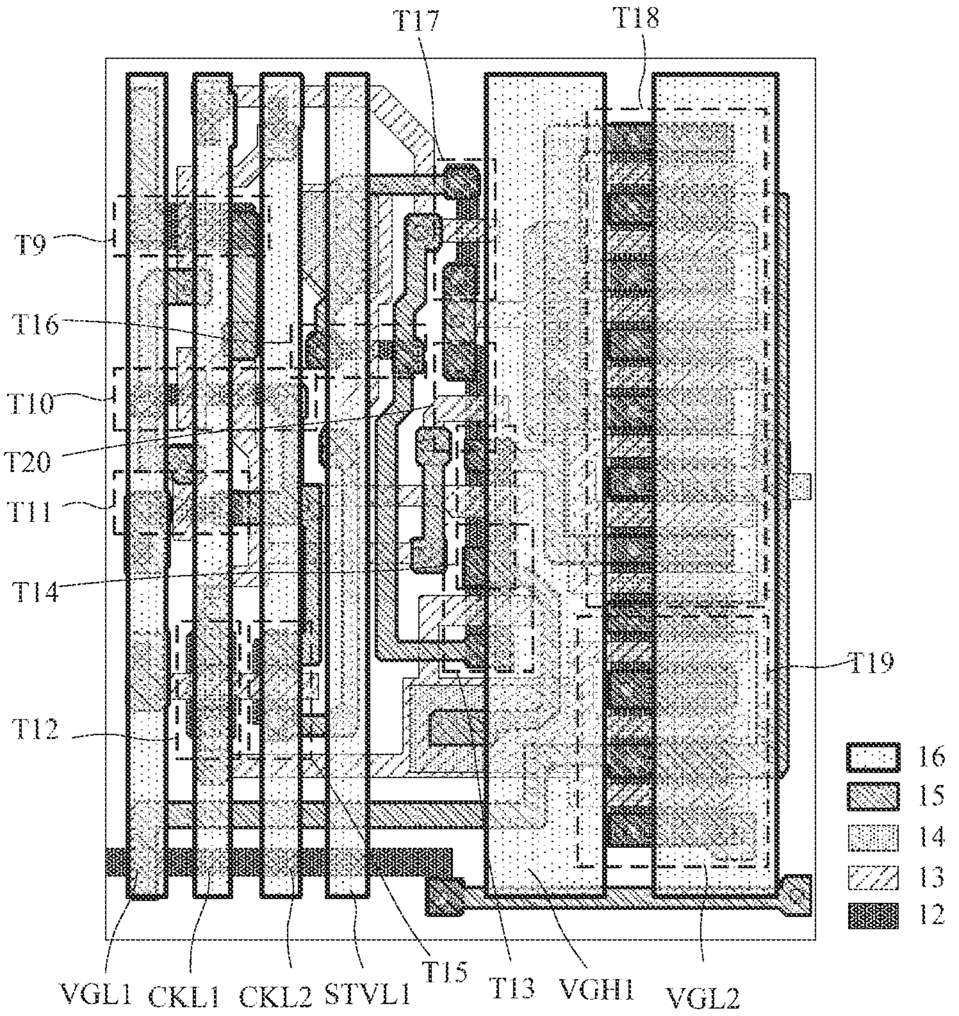
FIG. 10A is a structural layout of a "12T3C" circuit, in accordance with some embodiments.

Some embodiments of the present disclosure provide a film layer structure of a "12T3C" circuit, a diagram of which is shown in FIGS. 9 and 10A. In FIG. 10A, the diagram showing the film layer structure of the first shift register Scan-GOA is illustrated as an example.

Referring to FIG. 10A, the display panel 1100 further includes a first low-voltage signal line VGL1, a first clock signal line CKL1, a second clock signal line CKL2, a first start signal line STVL1, a first high-voltage signal line VGH1, and a second low-voltage signal line VGL2, which are located on the second source-drain conductive layer 16 and arranged in sequence along the first direction X.

In accordance with a connection relationship of the equivalent circuit diagram as shown FIG. 9, the "12T3C" circuit is electrically connected to the first low-voltage signal line VGL1, the first clock signal line CKL1, the second clock signal line CKL2, the first start signal line STVL1, the first high-voltage signal line VGH1, and the second low-voltage signal line VGL2, as will not be repeated herein. Here, on the substrate (not shown in the figure), orthographic projections of the above-described first low-voltage signal line VGL1, the first clock signal line CKL1, the second clock signal line CKL2, the first start signal line STVL1, the first high-voltage signal line VGH1, and the second low-voltage signal line VGL2 each partially overlap with an orthographic projection of at least one transistor or an orthographic projection of at least one capacitor in the "12T3C" circuit.

Figure 10B:
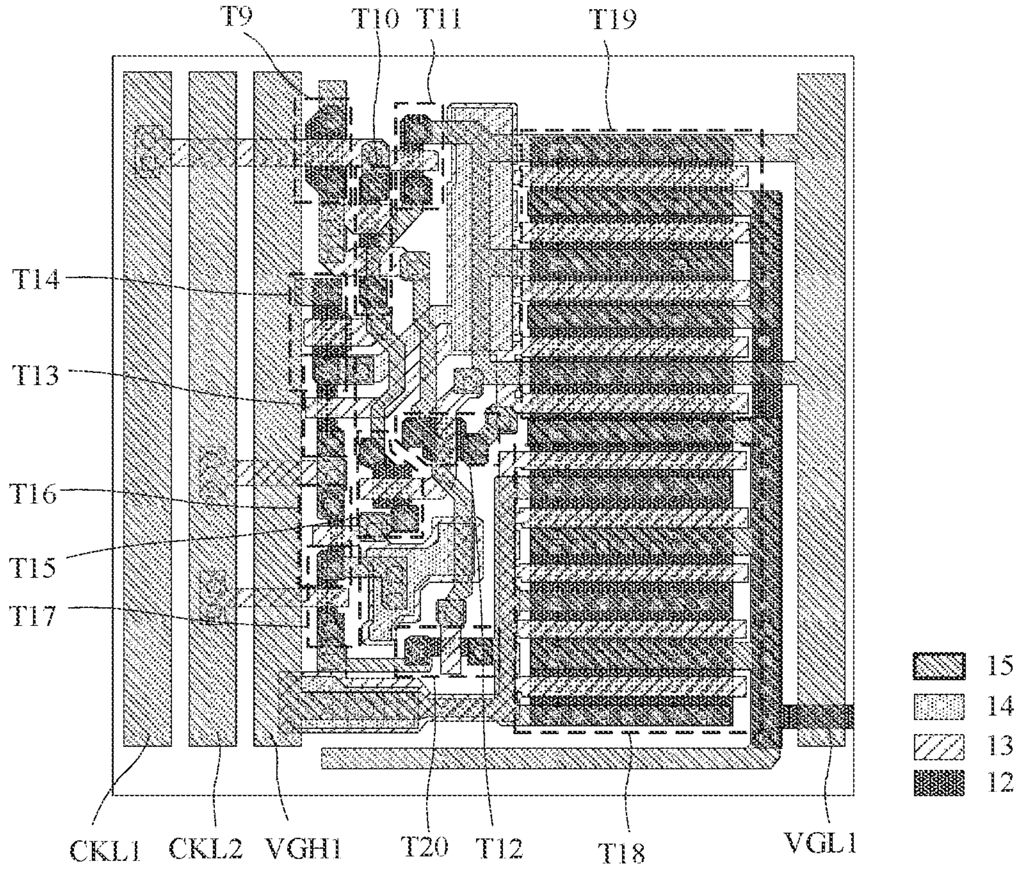
FIG. 10B is another structural layout of a "12T3C" circuit, in accordance with some embodiments.

Some other embodiments of the present disclosure provide a film layer structure of another "12T3C" circuit, a diagram of which is shown in FIGS. 9 and 10B. In FIG. 10B, the diagram showing the film layer structure of the first shift register Scan-GOA is illustrated as an example.

The display panel 1100 may include a first clock signal line CKL1, a second clock signal line CKL2, a first high-voltage signal line VGH1, and a first low-voltage signal line VGL1, which are located on the first source-drain conductive layer 15 and arranged in sequence along the first direction X. In accordance with a connection relationship of the equivalent circuit diagram as shown in FIG. 9, the "12T3C" circuit is electrically connected to the first clock signal line CKL1, the second clock signal line CKL2, the first high-voltage signal line VGH1, and the first low-voltage signal line VGL1, as will not be repeated herein. Here, on the substrate (not shown in the figure), orthographic projections of the above-described first clock signal line CKL1, the second clock signal line CKL2, the first high-voltage signal line VGH1, and the first low-voltage signal line VGL1 each are non-overlapping with an orthographic projection of each of the transistors and an orthographic projection of each of the capacitors in the "12T3C" circuit.

It will be appreciated that the first shift register Scan-GOA, the third shift register GN-GOA, and the fourth shift register EM-GOA may each adopt any one of the structures as shown in FIGS. 10A and 10B. For example, the first shift register Scan-GOA, the third shift register GN-GOA, and the fourth shift register EM-GOA may adopt the same structure, which is conducive to simplifying the manufacturing process of the display panel 1100.

Figure 11:
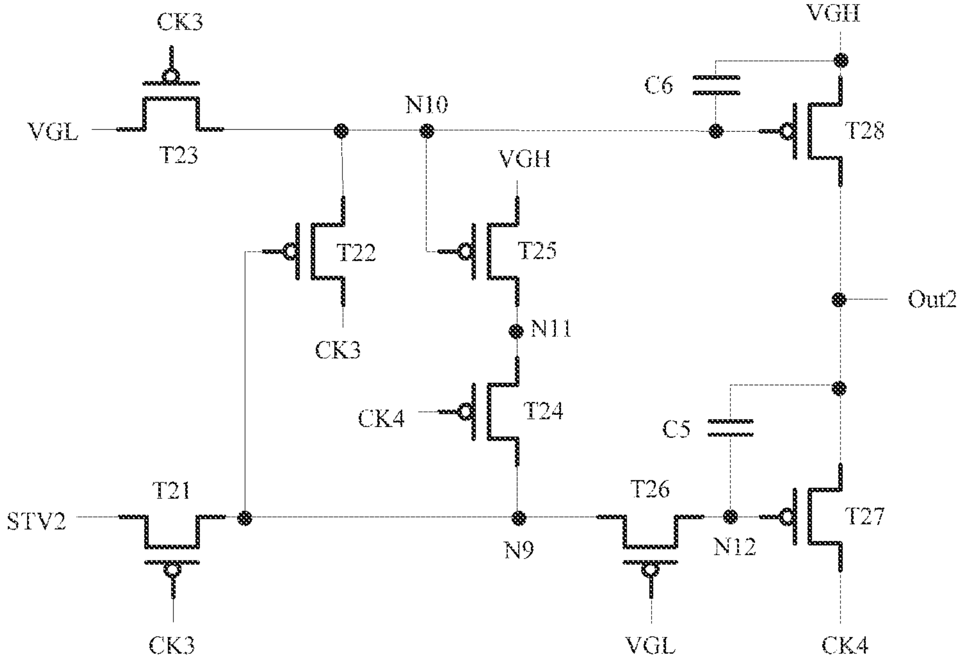
FIG. 11 is an equivalent circuit diagram of an "8T2C" circuit, in accordance with some embodiments.

For example, embodiments of the present disclosure provide an "8T2C" circuit of an equivalent circuit diagram shown in FIG. 11, in which all transistors are exemplified by P-type transistors. The "8T2C" circuit includes a twenty-first transistor T21, a twenty-second transistor T22, a twenty-third transistor T23, a twenty-fourth transistor T24, a twenty-fifth transistor T25, a twenty-sixth transistor T26, a twenty-seventh transistor T27, and a twenty-eighth transistor T28, and the "8T2C" circuit further includes a fifth capacitor C5 and a sixth capacitor C6.

Of the twenty-first transistor T21, a control electrode is electrically connected to a third clock signal terminal CK3, a first electrode is electrically connected to a second start signal terminal STV2, and a second electrode is electrically connected to a ninth node N9. In a case where the shift register is a shift register at the first-stage, the second start signal terminal STV2 may transmit a start signal output from a start signal line; a second start signal terminal STV1 electrically connected to other shift registers other than the shift register at the first-stage may transmit a cascade signal output from a shift register at a previous-stage.

Of the twenty-second transistor T22, a control electrode is electrically connected to the ninth node N9, a first electrode is electrically connected to the third clock signal terminal CK3, and a second electrode is electrically connected to a tenth node N10. Of the twenty-third transistor T23, a control electrode is electrically connected to the third clock signal terminal CK3, a first electrode is electrically connected to a low-voltage signal terminal VGL, and a second electrode is electrically connected to the tenth node N10. Of the twenty-fourth transistor T24, a control electrode is electrically connected to a fourth clock signal terminal CK4, a first electrode is electrically connected to the ninth node N9, and a second electrode is electrically connected to an eleventh node N11. Of the twenty-fifth transistor T25, a control electrode is electrically connected to the tenth node N10, a first electrode is electrically connected to a high-voltage signal terminal VGH, and a second electrode is electrically connected to the eleventh node N11. Of the twenty-sixth transistor T26, a control electrode is electrically connected to the low-voltage signal terminal VGL, a first electrode is electrically connected to the ninth node N9, and a second electrode is electrically connected to a twelfth node N12. Of the twenty-seventh transistor T27, a control electrode is electrically connected to the twelfth node N12, a first electrode is electrically connected to a fourth clock signal terminal CK4, and a second electrode is electrically connected to a second signal output terminal Out2. Of the twenty-eighth transistor T28, a control electrode is electrically connected to the tenth node N10, a first electrode is electrically connected to the high-voltage signal terminal VGH, and a second electrode is electrically connected to the second signal output terminal Out2.

Of the fifth capacitor C5, a first electrode plate is electrically connected to the twelfth node N12, and a second electrode plate is electrically connected to the second signal output terminal. Of the sixth capacitor C6, a first electrode plate is electrically connected to the tenth node N10, and a second electrode plate is electrically connected to the high-voltage signal end VGH.

Here, the second start signal terminal STV2 may be connected to a first start signal line STVL1 (or a second start signal line STVL2) hereinafter, the third clock signal terminal CK3 may be connected to a third clock signal line CKL3 hereinafter, the fourth clock signal terminal CK4 may be connected to a fourth clock signal line CKL4 hereinafter, the low-voltage signal terminal VGL may be connected to second low-voltage signal line VGL2 (or a third low-voltage signal line VGL3) hereinafter, and the high-voltage signal terminal VGH may be connected to a second high-voltage signal line VGH2 hereinafter.

Figure 12:
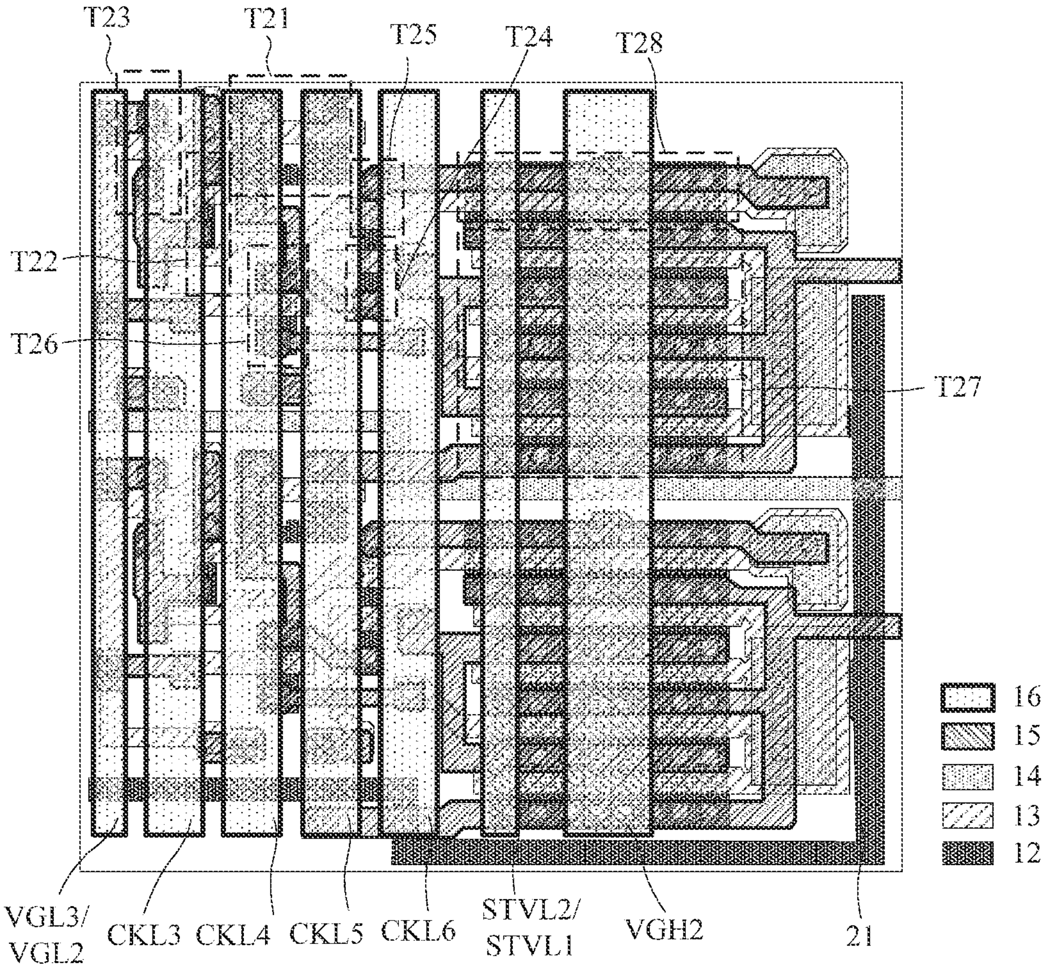
FIG. 12 is a structural layout of an "8T2C" circuit, in accordance with some embodiments.

Referring to FIG. 12, some embodiments of the present disclosure provide a structural layout of the "8T2C" circuit. In FIG. 12, the diagram showing the film layer structure of the second shift register GP-GOA is illustrated as an example.

The display panel 1100 may include a second low-voltage signal line VGL2 (or a third low-voltage signal line VGL3), a third clock signal line CKL3, a fourth clock signal line CKL4, a fifth clock signal line CKL5, a sixth clock signal line CKL6, a first start signal line STVL1 (or a second start signal line STVL2), and a second high-voltage signal line VGH2, which are located on the second source-drain conductive layer 16 and arranged in sequence along the first direction X.

For example, in a case where the structure of the "12T3C" circuit is as shown in FIG. 10A, the second shift register GP-GOA is electrically connected to two of the third clock signal line CKL3, the fourth clock signal line CKL4, the fifth clock signal line CKL5, and the sixth clock signal line CKL6, and is electrically connected to the third low-voltage signal line VGL3, the second start signal line STVL2, and the second high-voltage signal line VGH2.

For example, in a case where the structure of the "12T3C" circuit is as shown in FIG. 10B, the second shift register GP-GOA is electrically connected to two of the third clock signal line CKL3, the fourth clock signal line CKL4, the fifth clock signal line CKL5, and the sixth clock signal line CKL6, and is electrically connected to the second low-voltage signal line VGL2, the first start signal line STVL1, and the second high-voltage signal line VGH2.

For example, the second shift register GP-GOA is electrically connected to two of the third clock signal line CKL3, the fourth clock signal line CKL4, the fifth clock signal line CKL5, and the sixth clock signal line CKL6 by means of staggering stage-by-stage. For example, among the plurality of second shift registers GP-GOA provided in cascade, a second shift register GP-GOA at the first-stage is electrically connected to the third clock signal line CKL3 and the fourth clock signal line CKL4, a second shift register GP-GOA at the second-stage is electrically connected to the fourth clock signal line CKL4 and the fifth clock signal line CKL5, a second shift register GP-GOA at the third-stage is electrically connected to the fifth clock signal line CKL5 and the sixth clock signal line CKL6, a second shift register GP-GOA at the fourth-stage is electrically connected to the sixth clock signal line CKL6 and the third clock signal line CKL3, and so on, and the embodiments of the present disclosure will not be listed one by one.

It will be understood that based on the above two structural layouts of the "12T3C" circuit, the number of signal lines (including the clock signal lines, low-voltage signal lines, high-voltage signal lines, start signal lines, and so forth) included in the display panels 1100 may vary, and the names of these signal lines may vary, but none of which affects the structure of the "8T2C" circuit or the signal lines connected to the "8T2C" circuit, and the naming of the signal lines is only adapted according to the specific structure of the "12T3C" circuit.

Figure 13A:
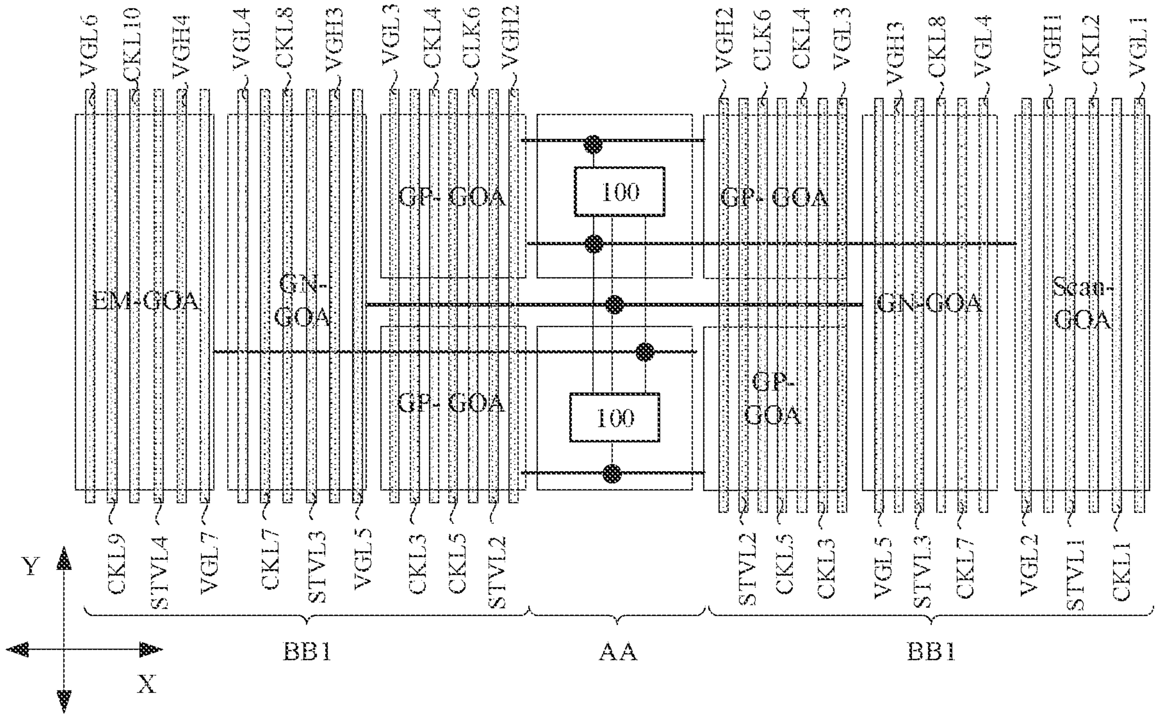
FIGS. 13A to 13C are diagrams each showing a connection relationship between multiple shift registers and a plurality of signal lines, in accordance with some embodiments.
Figure 13B:
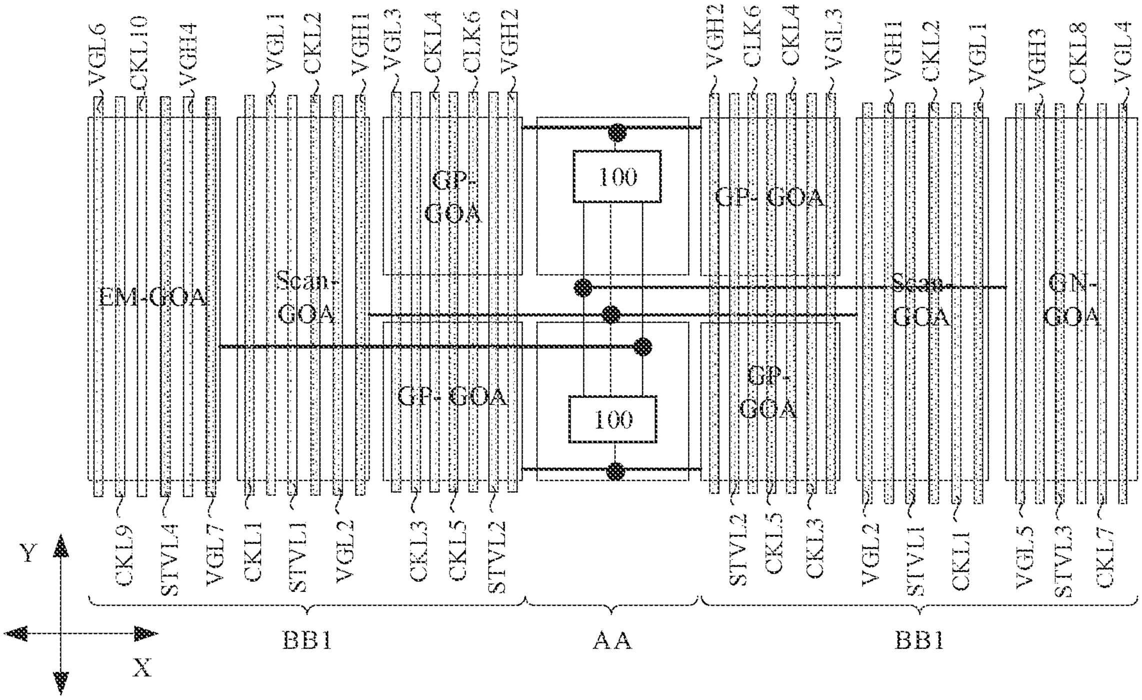

In some embodiments, in which the first shift register Scan-GOA, the third shift register GN-GOA, and the fourth shift register EM-GOA each adopt a structural layout as shown in FIG. 10A, referring to FIGS. 13A and 13B, the display panel 1100 further includes first to tenth clock signal lines, first to seventh low-voltage signal lines, first to fourth high-voltage signal lines, and first to fourth start signal lines. It will be appreciated that in order to simplify the contents of the accompanying drawings, the specific structures of the shift registers (the first shift register to the fourth shift register) and pixel circuits are not shown in FIGS. 13A to 13C.

The first shift register Scan-GOA is electrically connected to the first low-voltage signal line VGL1, the first clock signal line CKL1, the second clock signal line CKL2, the first start signal line STVL1, the first high-voltage signal line VGH1, and the second low-voltage signal line VGL2.

It will be appreciated that among a plurality of first shift registers Scan-GOA in cascade, a first shift register Scan-GOA at the first-stage is electrically connected to the first start signal line STVL1, and the other first shift registers Scan-GOA may each be electrically connected to a cascade signal output terminal of a first shift register Scan-GOA at a previous-stage thereof.

The second shift register GP-GOA is electrically connected to two of the third clock signal line CKL3, the fourth clock signal line CKL4, the fifth clock signal line CKL5, and the sixth clock signal line CKL6, and is electrically connected to the third low-voltage signal line VGL3, the second start signal line STVL2, and the second high-voltage signal line VGH2. Similar to the first shift register Scan-GOA, a second shift register GP-GOA at the first-stage is electrically connected to the second start signal line STVL2, and the other second shift registers GP-GOA may each be electrically connected to a cascade signal output terminal of a second shift register GP-GOA at a previous-stage thereof.

The third shift register GN-GOA is electrically connected to the fourth low-voltage signal line VGL4, the seventh clock signal line CKL7, the eighth clock signal line CKL8, the third start signal line STVL3, the third high-voltage signal line VGH3, and the fifth low-voltage signal line VGL5. Similar to the first shift register Scan-GOA, a third shift register GN-GOA at the first-stage is electrically connected to the third start signal line STVL3, and the other third shift registers GN-GOA may each be electrically connected to a cascade signal output terminal of a third shift register GN-GOA at a previous-stage thereof.

The fourth shift register EM-GOA is electrically connected to the sixth low-voltage signal line VGL6, the ninth clock signal line CKL9, the tenth clock signal line CKL10, the fourth start signal line STVL4, the fourth high-voltage signal line VGH4, and the seventh low-voltage signal line VGL7. Similar to the first shift register Scan-GOA, a fourth shift register EM-GOA at the first-stage is electrically connected to the fourth start signal line STVL4, and the other fourth shift registers EM-GOA may each be electrically connected to a cascade signal output terminal of a fourth shift register EM-GOA at a previous-stage thereof.

In some embodiments, as shown in FIG. 13A, a row of pixel circuits 100 is correspondingly connected to one first shift register Scan-GOA, two second shift registers GP-GOA, two third shift registers GN-GOA, and one fourth shift register EM-GOA. In this case, there exists the following arrangement.

Two sides BB1 include a side (the left side in FIG. 13A) at which the fourth shift register EM-GOA is located. At this side and along a direction in the first direction X and proximate to the plurality of pixel circuits 100 (a direction from left to right), a sixth low-voltage signal line VGL6, a ninth clock signal line CKL9, a tenth clock signal line CKL10, a fourth start signal line STVL4, a fourth high-voltage signal line VGH4, a seventh low-voltage signal line VGL7, a fourth low-voltage signal line VGL4, a seventh clock signal line CKL7, and an eighth clock signal line CKL8, a third start signal line STVL3, a third high-voltage signal line VGH3, a fifth low-voltage signal line VGL5, a third low-voltage signal line VGL3, a third clock signal line CKL3, a fourth clock signal line CKL4, a fifth clock signal line CKL5, a sixth clock signal line CKL6, a second start signal line STVL2, and a second high-voltage signal line VGH2 are arranged in sequence.

The two sides BB1 include a side (the right side in FIG. 13A) at which the first shift register Scan-GOA is located. At this side and along a direction in the first direction X and proximate to the plurality of pixel circuits 100 (a direction from right to left), a first low-voltage signal line VGL1, a first clock signal line CKL1, a second clock signal line CKL2, a first start signal line STVL1, a first high-voltage signal line VGH1, a second low-voltage signal line VGL2, a fourth low-voltage signal line VGL4, a seventh clock signal line CKL7, an eighth clock signal line CKL8, a third start signal line STVL3, a third high-voltage signal line VGH3, a fifth low-voltage signal line VGL5, a third low-voltage signal line VGL3, a third clock signal line CKL3, a fourth clock signal line CKL4, a fifth clock signal line CKL5, a sixth clock signal line CKL6, a second start signal line STVL2, and a second high-voltage signal line VGH2 are arranged in sequence.

Based on the above arrangement of the signal lines, the number of signal lines in each of the two sides BB1 is approximately the same, thereby optimizing the wiring space of the two sides BB1 and reducing the width of the two sides BB1.

In some embodiments, as shown in FIG. 13B, a row of pixel circuits 100 is correspondingly connected to one third shift register GN-GOA, two first shift registers Scan-GOA, two second shift registers GP-GOA, and one fourth shift register EM-GOA. In this case, there exists the following arrangement.

Two sides BB1 include a side (the left side in FIG. 13B) at which the fourth shift register EM-GOA is located. At this side and along a direction in the first direction X and proximate to the plurality of pixel circuits 100 (a direction from left to right), a sixth low-voltage signal line VGL6, a ninth clock signal line CKL9, a tenth clock signal line CKL10, a fourth start signal line STVL4, a fourth high-voltage signal line VGH4, a seventh low-voltage signal line VGL7, a first low-voltage signal line VGL1, a first clock signal line CKL1, a second clock signal line CKL2, a first start signal line STVL1, a first high-voltage signal line VGH1, a second low-voltage signal line VGL2, a third low-voltage signal line VGL3, a third clock signal line CKL3, a fourth clock signal line CKL4, a fifth clock signal line CKL5, a sixth clock signal line CKL6, a second start signal line STVL2, and a second high-voltage signal line VGH2 are arranged in sequence.

Two sides BB1 include a side (the right side in FIG. 13B) at which the third shift register GN-GOA is located. At this side and along a direction in the first direction X and proximate to the plurality of pixel circuits 100 (a direction from right to left), a fourth low-voltage signal line VGL4, a seventh clock signal line CKL7, an eighth clock signal line CKL8, a third start signal line STVL3, a third high-voltage signal line VGH3, a fifth low-voltage signal line VGL5, a first low-voltage signal line VGL1, a first clock signal line CKL1, a second clock signal line CKL2, a first start signal line STVL1, a first high-voltage signal line VGH1, a second low-voltage signal line VGL2, a third low-voltage signal line VGL3, a third clock signal line CKL3, a fourth clock signal line CKL4, a fifth clock signal line CKL5, a sixth clock signal line CKL6, a second start signal line STVL2, and a second high-voltage signal line VGH2 are arranged in sequence. Based on the above arrangement of the signal lines, the number of signal lines in each of the two sides BB1 is approximately the same, thereby optimizing the wiring space of the two sides BB1 and reducing the width of the two sides BB1.

Figure 13C:
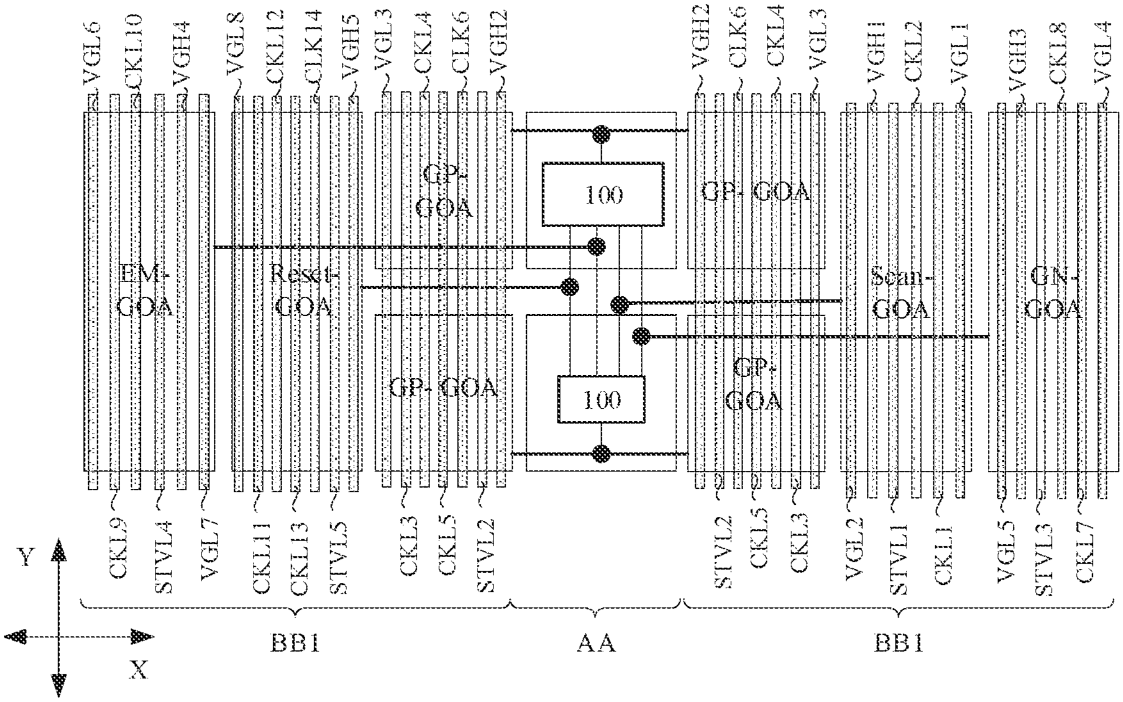

In some embodiments, referring to FIG. 13C, in a case where the display panel 1100 further includes fifth shift register(s) Reset-GOA, the display panel 1100 further includes eleventh to fourteenth clock signal lines, an eighth low-voltage signal line VGL8, a fifth high-voltage signal line VGH5, and a fifth start signal line STVL5.

A fifth shift register Reset-GOA is electrically connected to two of the eleventh clock signal line CKL11, the twelfth clock signal line CKL12, the thirteenth clock signal line CKL13, and the fourteenth clock signal line CKL14, and is electrically connected to the eighth low-voltage signal line VGL8, the fifth start signal line STVL5, and the fifth high-voltage signal line GH5.

For example, a row of pixel circuits 100 is electrically connected to one first shift register Scan-GOA, two second shift registers GP-GOA, one third shift register GN-GOA, one fourth shift register EM-GOA, and one fifth shift register Reset-GOA.

As shown in FIG. 13C, two sides BB1 include a side (the left side in FIG. 13C) at which the fourth shift register EM-GOA and the fifth shift register Reset-GOA are located. At this side and along a direction in the first direction X and proximate to the plurality of pixel circuits 100 (a direction from left to right), a sixth low-voltage signal line VGL6, a ninth clock signal line CKL9, a tenth clock signal line CKL10, a fourth start signal line STVL4, a fourth high-voltage signal line VGH4, a seventh low-voltage signal line VGL7, an eighth low-voltage signal line VGL8, an eleventh clock signal line CKL11, a twelfth clock signal line CKL12, and a thirteenth clock signal line CKL13, a fourteenth clock signal line CKL14, a fifth start signal line STVL5, a fifth high-voltage signal line VGH5, a third low-voltage signal line VGL3, a third clock signal line CKL3, a fourth clock signal line CKL4, a fifth clock signal line CKL5, a sixth clock signal line CKL6, a second start signal line STVL2, and a second high-voltage signal line VGH2 are arranged in sequence.

Two sides BB1 include a side (the right side in FIG. 13C) at which the first shift register Scan-GOA and the third shift register GN-GOA are located. At this side and along a direction in the first direction X and proximate to the plurality of pixel circuits 100 (a direction from right to left), a fourth low-voltage signal line VGL4, a seventh clock signal line CKL7, an eighth clock signal line CKL8, a third start signal line STVL3, a third high-voltage signal line VGH3, a fifth low-voltage signal line VGL5, a first low-voltage signal line VGL1, a first clock signal line CKL1, a second clock signal line CKL2, a first start signal line STVL1, a first high-voltage signal line VGH1, a second low-voltage signal line VGL2, a third low-voltage signal line VGL3, a third clock signal line CKL3, a fourth clock signal line CKL4, a fifth clock signal line CKL5, a sixth clock signal line CKL6, a second start signal line STVL2, and a second high-voltage signal line VGH2 are arranged in sequence. Based on the above arrangement of the signal lines, the number of signal lines in each of the two sides BB1 is approximately the same, thereby optimizing the wiring space of the two sides BB1 and reducing the width of the two sides BB1.

Figure 14A:
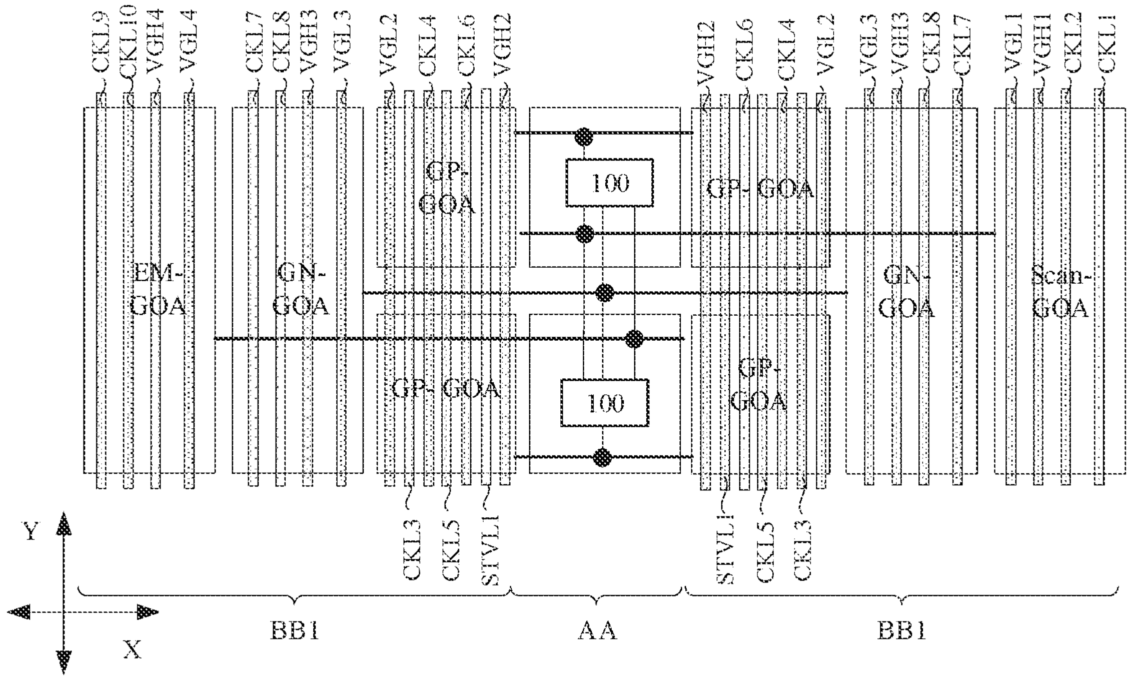
FIGS. 14A to 14C are diagrams each showing a connection relationship between multiple shift registers and a plurality of signal lines, in accordance with some embodiments.
Figure 14B:
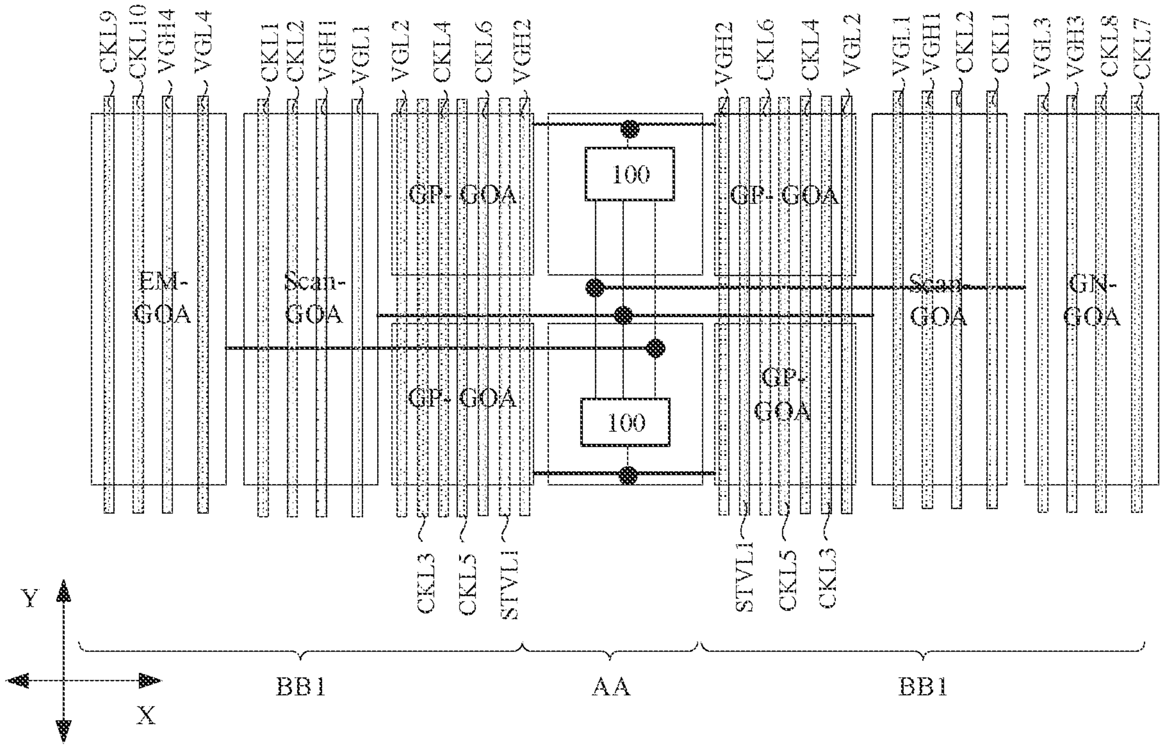

In some embodiments, in which the first shift register Scan-GOA, the third shift register GN-GOA, and the fourth shift register EM-GOA each adopt a structural layout as shown in FIG. 10B, referring to FIGS. 14A and 14B, the display panel 1100 further includes first to tenth clock signal lines, first to fourth low-voltage signal lines, first to fourth high-voltage signal lines, and a first start signal line.

The first shift register Scan-GOA is electrically connected to the first clock signal line CKL1, the second clock signal line CKL2, the first high-voltage signal line VGH1 and the first low-voltage signal line VGL1. The second shift register GP-GOA is electrically connected to two of the third clock signal line CKL3, the fourth clock signal line CKL4, the fifth clock signal line CKL5 and the sixth clock signal line CKL6, and is electrically connected to the second low-voltage signal line VGL2, the first start signal line STVL1 and the second high-voltage signal line VGH2. The third shift register GN-GOA is electrically connected to the seventh clock signal line CKL7, the eighth clock signal line CKL8, the third high-voltage signal line VGH3 and the third low-voltage signal line VGL3. The fourth shift register EM-GOA is electrically connected to the ninth clock signal line CKL9, the tenth clock signal line CKL10, the fourth high-voltage signal line VGH4 and the fourth low-voltage signal line VGL4.

In some embodiments, as shown in FIG. 14A, a row of pixel circuits 100 is correspondingly connected to one first shift register Scan-GOA, two second shift registers GP-GOA, two third shift registers GN-GOA, and one fourth shift register EM-GOA. In this case, there exists the following arrangement.

Two sides BB1 include a side (the left side in FIG. 14A) at which the fourth shift register EM-GOA is located. At this side and along a direction in the first direction X and proximate to the plurality of pixel circuits 100 (a direction from left to right), a ninth clock signal line CKL9, a tenth clock signal line CKL10, a fourth high-voltage signal line VGH4, a fourth low-voltage signal line VGL4, a seventh clock signal line CKL7, an eighth clock signal line CKL8, a third high-voltage signal line VGH3, a third low-voltage signal line VGL3, a second low-voltage signal line VGL2, a third clock signal line CKL3, a fourth clock signal line CKL4, a fifth clock signal line CKL5, a sixth clock signal line CKL6, a first start signal line STVL1, and a second high-voltage signal line VGH2 are arranged in sequence.

The two sides BB1 include a side (the right side in FIG. 14A) at which the first shift register Scan-GOA is located. At this side and along a direction in the first direction X and proximate to the plurality of pixel circuits 100 (a direction from right to left), a first clock signal line CKL1, a second clock signal line CKL2, a first high-voltage signal line VGH1, a first low-voltage signal line VGL1, a seventh clock signal line CKL7, an eighth clock signal line CKL8, a third high-voltage signal line VGH3, a third low-voltage signal line VGL3, a second low-voltage signal line VGL2, a third clock signal line CKL3, a fourth clock signal line CKL4, a fifth clock signal line CKL5, a sixth clock signal line CKL6, a first start signal line STVL1, and a second high-voltage signal line VGH2 are arranged in sequence. Based on the above arrangement of the signal lines, the number of signal lines in each of the two sides BB1 is approximately the same, thereby optimizing the wiring space of the two sides BB1 and reducing the width of the two sides BB1.

In some embodiments, as shown in FIG. 14B, a row of pixel circuits 100 is correspondingly connected to one third shift register GN-GOA, two first shift registers Scan-GOA, two second shift registers GP-GOA, and one fourth shift register EM-GOA. In this case, there exists the following arrangement.

Two sides BB1 include a side (the left side in FIG. 14B) at which the fourth shift register EM-GOA is located. At this side and along a direction in the first direction X and proximate to the plurality of pixel circuits 100 (a direction from left to right), a ninth clock signal line CKL9, a tenth clock signal line CKL10, a fourth high-voltage signal line VGH4, a fourth low-voltage signal line VGL4, a first clock signal line CKL1, a second clock signal line CKL2, a first high-voltage signal line VGH1, a first low-voltage signal line VGL1, a second low-voltage signal line VGL2, a third clock signal line CKL3, a fourth clock signal line CKL4, a fifth clock signal line CKL5, a sixth clock signal line CKL6, a first start signal line STVL1, and a second high-voltage signal line VGH2 are arranged in sequence.

Two sides BB1 include a side (the right side in FIG. 14B) at which the third shift register GN-GOA is located. At this side and along a direction in the first direction X and proximate to the plurality of pixel circuits 100 (a direction from right to left), a seventh clock signal line CKL7, an eighth clock signal line CKL8, a third high-voltage signal line VGH3, a third low-voltage signal line VGL3, a first clock signal line CKL1, a second clock signal line CKL2, a first high-voltage signal line VGH1, a first low-voltage signal line VGL1, a second low-voltage signal line VGL2, a third clock signal line CKL3, a fourth clock signal line CKL4, a fifth clock signal line CKL5, a sixth clock signal line CKL6, a first start signal line STVL1, and a second high-voltage signal line VGH2 are arranged in sequence. Based on the above arrangement of the signal lines, the number of signal lines in each of the two sides BB1 is approximately the same, thereby optimizing the wiring space of the two sides BB1 and reducing the width of the two sides BB1.

Figure 14C:
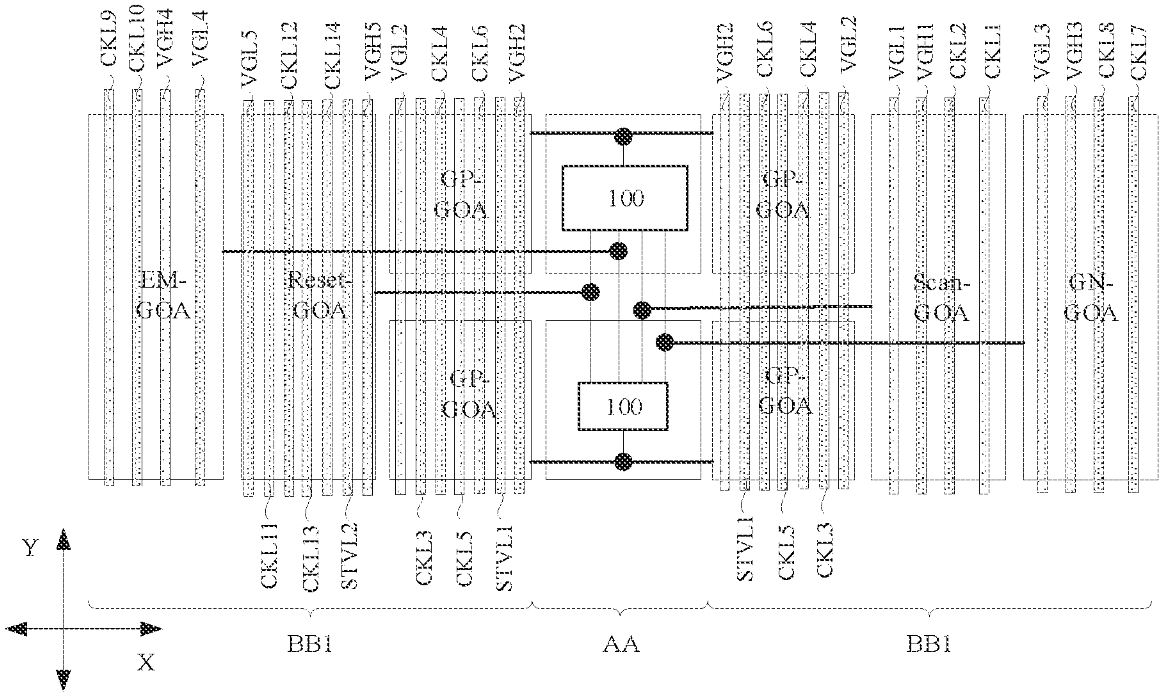

In some embodiments, referring to FIG. 14C, in a case where the display panel 1100 further includes fifth shift register(s) Reset-GOA, the display panel 1100 further includes eleventh to fourteenth clock signal lines, a fifth low-voltage signal line, a second start signal line, and a fifth high-voltage signal line.

A fifth shift register Reset-GOA is electrically connected to two of the eleventh clock signal line CKL11, the twelfth clock signal line CKL12, the thirteenth clock signal line CKL13, and the fourteenth clock signal line CKL14, and is electrically connected to the fifth low-voltage signal line VGL5, the second start signal line STVL2 and the fifth high-voltage signal line VGH5.

For example, referring to FIG. 14C, a row of pixel circuits 100 is correspondingly connected to one first shift register Scan-GOA, two second shift registers GP-GOA, one third shift register GN-GOA, one fourth shift register EM-GOA, and one fifth shift register Reset-GOA.

Two sides BB1 include a side (the left side in FIG. 14C) at which the fourth shift register EM-GOA and the fifth shift register Reset-GOA are located. At this side and along a direction in the first direction X and proximate to the plurality of pixel circuits 100 (a direction from left to right), a ninth clock signal line CKL9, a tenth clock signal line CKL10, a fourth high-voltage signal line VGH4, a fourth low-voltage signal line VGL4, a fifth low-voltage signal line VGL5, an eleventh clock signal line CKL11, a twelfth clock signal line CKL12, a thirteenth clock signal line CKL13, a fourteenth clock signal line CKL14, a second start signal line STVL2, a fifth high-voltage signal line VGH5, a second low-voltage signal line VGL2, a third clock signal line CKL3, a fourth clock signal line CKL4, a fifth clock signal line CKL5, a sixth clock signal line CKL6, a first start signal line STVL1, and a second high-voltage signal line VGH2 are arranged in sequence.

Two sides BB1 include a side (the right side in FIG. 14C) at which the first shift register Scan-GOA and the third shift register GN-GOA are located. At this side and along a direction in the first direction X and proximate to the plurality of pixel circuits 100 (a direction from right to left), a seventh clock signal line CKL7, an eighth clock signal line CKL8, a third high-voltage signal line VGH3 and a third low-voltage signal line VGL3, a first clock signal line CKL1, a second clock signal line CKL2, a first high-voltage signal line VGH1, a first low-voltage signal line VGL1, a second low-voltage signal line VGL2, a third clock signal line CKL3, a fourth clock signal line CKL4, a fifth clock signal line CKL5, a sixth clock signal line CKL6, a first start signal line STVL1, and a second high-voltage signal line VGH2 are arranged in sequence. Based on the above arrangement of the signal lines, the number of signal lines in each of the two sides BB1 is approximately the same, thereby optimizing the wiring space of the two sides BB1 and reducing the width of the two sides BB1.

The foregoing description is only specific embodiments of the present disclosure, but the scope of protection of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:

a plurality of pixel circuits, arranged in multiple rows and multiple columns;

a plurality of light-emitting devices;

at least one first shift register, a first shift register being correspondingly connected to at least one row of pixel circuits, and the first shift register being configured to transmit a first scanning signal to the at least one row of pixel circuits correspondingly connected thereto;

at least one second shift register, a second shift register being correspondingly connected to a row of pixel circuits, and the second shift register being configured to transmit a second scanning signal to the row of pixel circuits correspondingly connected thereto;

at least one third shift register, a third shift register being correspondingly connected to at least one row of pixel circuits, and the third shift register being configured to transmit a third scanning signal to the at least one row of pixel circuits correspondingly connected thereto; and at least one fourth shift register, a fourth shift register being correspondingly connected to at least one row of pixel circuits, and the fourth shift register being configured to transmit a fourth scanning signal to the at least one row of pixel circuits correspondingly connected thereto;

wherein a pixel circuit of the plurality of pixel circuits includes a driving transistor, a bias sub-circuit, a data writing sub-circuit, a compensation sub-circuit, a leakage prevention sub-circuit, a reset sub-circuit, and a light-emission control sub-circuit, wherein the bias sub-circuit is electrically connected to the first shift register, a reference voltage terminal and a source of the driving transistor, and is configured to, under control of the first scanning signal, transmit a reference voltage from the reference voltage terminal to the source of the driving transistor;

the data writing sub-circuit is electrically connected to the second shift register, a data signal terminal and the source of the driving transistor, and is configured to, under control of the second scanning signal, transmit a data signal from the data signal terminal to the source of the driving transistor;

the compensation sub-circuit is electrically connected to the second shift register, a drain of the driving transistor and a first node, and is configured to, under control of the second scanning signal, transmit a compensated data signal to the first node;

the leakage prevention sub-circuit is electrically connected to the third shift register, the first node and a gate of the driving transistor, and is configured to, under control of the third scanning signal, cause a connection to be formed between the first node and the gate of the driving transistor;

the reset sub-circuit is electrically connected to the first node and a light-emitting device, electrically connected to the pixel circuit, of the plurality light-emitting devices, and is configured to reset a voltage of the first node and a voltage of the light-emitting device; and the light-emission control sub-circuit is electrically connected to the fourth shift register, a first voltage signal terminal, the driving transistor and the light-emitting device, and is configured to, under control of the fourth scanning signal, cause a path to be formed between the driving transistor and the light-emission control sub-circuit to transmit a driving current to the light-emitting device;

wherein a row of pixel circuits is correspondingly connected to one first shift register, two third shift registers and one fourth shift register; and the row of pixel circuits has opposite two sides along a first direction, and the first direction is a direction in which the row of pixel circuits is arranged, wherein the fourth shift register and one of the third shift registers are located at one side of the two sides, and the first shift register and an other one of the third shift registers are located at an other side of the two sides.

2. The display panel according to claim 1, wherein at least one of the first shift register and the third shift register is located at the one side of the two sides.

3. The display panel according to claim 1, wherein a row of pixel circuits is correspondingly connected to two second shift registers; one of the second shift registers is located at the one side of the opposite two sides of the row of pixel circuits along the first direction, and is adjacent to the row of pixel circuits; and an other one of the second shift registers is located at the other side of the opposite two sides of the row of pixel circuits along the first direction, and is adjacent to the row of pixel circuits.

4. The display panel according to claim 1, wherein the first shift register, the third shift register and the fourth shift register each include twelve transistors and three capacitors, and the second shift register includes eight transistors and two capacitors; and the display panel further comprises: a first clock signal line, a second clock signal line, a third clock signal line, a fourth clock signal line, a fifth clock signal line, a sixth clock signal line, a seventh clock signal line, an eighth clock signal line, a ninth clock signal line, and a tenth clock signal line; a first low-voltage signal line, a second low-voltage signal line, a third low-voltage signal line, a fourth low-voltage signal line, a fifth low-voltage signal line, a sixth low-voltage signal line, and a seventh low-voltage signal line; a first high-voltage signal line, a second high-voltage signal line, a third high-voltage signal line, and a fourth high-voltage signal line; and a first start signal line, a second start signal line, a third start signal line, and a fourth start signal line, wherein the first shift register is electrically connected to the first low-voltage signal line, the first clock signal line, the second clock signal line, the first start signal line, the first high-voltage signal line, and the second low-voltage signal line;

the second shift register is electrically connected to two of the third clock signal line, the fourth clock signal line, the fifth clock signal line, and the sixth clock signal line, and is electrically connected to the third low-voltage signal line, the second start signal line and the second high-voltage signal line;

the third shift register is electrically connected to the fourth low-voltage signal line, the seventh clock signal line, the eighth clock signal line, the third start signal line, the third high-voltage signal line, and the fifth low-voltage signal line; and the fourth shift register is electrically connected to the sixth low-voltage signal line, the ninth clock signal line, the tenth clock signal line, the fourth start signal line, the fourth high-voltage signal line, and the seventh low-voltage signal line.

5. The display panel according to claim 4, wherein the two sides include a side at which the fourth shift register is located; and at the side and along a direction that is in the first direction and from the side to the plurality of pixel circuits, a sixth low-voltage signal line, a ninth clock signal line, a tenth clock signal line, a fourth start signal line, a fourth high-voltage signal line, a seventh low-voltage signal line, a fourth low-voltage signal line, a seventh clock signal line, an eighth clock signal line, a third start signal line, a third high-voltage signal line, a fifth low-voltage signal line, a third low-voltage signal line, a third clock signal line, a fourth clock signal line, a fifth clock signal line, a sixth clock signal line, a second start signal line, and a second high-voltage signal line are arranged in sequence; and the two sides include a side at which the first shift register is located; and at the side and along a direction that is in the first direction and from the side to the plurality of pixel circuits, a first low-voltage signal line, a first clock signal line, a second clock signal line, a first start signal line, a first high-voltage signal line, a second low-voltage signal line, a fourth low-voltage signal line, a seventh clock signal line, an eighth clock signal line, a third start signal line, a third high-voltage signal line, a fifth low-voltage signal line, a third low-voltage signal line, a third clock signal line, a fourth clock signal line, a fifth clock signal line, a sixth clock signal line, a second start signal line, and a second high-voltage signal line are arranged in sequence.

6. The display panel according to claim 4, wherein the first shift register, the third shift register and the fourth shift register each include twelve transistors and three capacitors, and the second shift register includes eight transistors and two capacitors; and the display panel further comprises: a first clock signal line, a second clock signal line, a third clock signal line, a fourth clock signal line, a fifth clock signal line, a sixth clock signal line, a seventh clock signal line, an eighth clock signal line, a ninth clock signal line, and a tenth clock signal line; a first low-voltage signal line, a second low-voltage signal line, a third low-voltage signal line, a fourth low-voltage signal line, a fifth low-voltage signal line, a sixth low-voltage signal line, and a seventh low-voltage signal line; a first high-voltage signal line, a second high-voltage signal line, a third high-voltage signal line, and a fourth high-voltage signal line; and a first start signal line, a second start signal line, a third start signal line, and a fourth start signal line, wherein the first shift register is electrically connected to the first low-voltage signal line, the first clock signal line, the second clock signal line, the first start signal line, the first high-voltage signal line, and the second low-voltage signal line;

the second shift register is electrically connected to two of the third clock signal line, the fourth clock signal line, the fifth clock signal line, and the sixth clock signal line, and is electrically connected to the third low-voltage signal line, the second start signal line and the second high-voltage signal line;

the third shift register is electrically connected to the fourth low-voltage signal line, the seventh clock signal line, the eighth clock signal line, the third start signal line, the third high-voltage signal line, and the fifth low-voltage signal line; and the fourth shift register is electrically connected to the sixth low-voltage signal line, the ninth clock signal line, the tenth clock signal line, the fourth start signal line, the fourth high-voltage signal line, and the seventh low-voltage signal line; wherein the two sides include a side at which the fourth shift register is located; and at the side and along a direction that is in the first direction and from the side to the plurality of pixel circuits, a sixth low-voltage signal line, a ninth clock signal line, a tenth clock signal line, a fourth start signal line, a fourth high-voltage signal line, a seventh low-voltage signal line, a first low-voltage signal line, a first clock signal line, a second clock signal line, a first start signal line, a first high-voltage signal line, a second low-voltage signal line, a third low-voltage signal line, a third clock signal line, a fourth clock signal line, a fifth clock signal line, a sixth clock signal line, a second start signal line, and a second high-voltage signal line are arranged in sequence; and the two sides include a side at which the third shift register is located; and at the side and along a direction that is in the first direction and from the side to the plurality of pixel circuits, a fourth low-voltage signal line, a seventh clock signal line, an eighth clock signal line, a third start signal line, a third high-voltage signal line, a fifth low-voltage signal line, a first low-voltage signal line, a first clock signal line, a second clock signal line, a first start signal line, a first high-voltage signal line, a second low-voltage signal line, a third low-voltage signal line, a third clock signal line, a fourth clock signal line, a fifth clock signal line, a sixth clock signal line, a second start signal line, and a second high-voltage signal line are arranged in sequence.

7. The display panel according to claim 1, wherein the first shift register, the third shift register and the fourth shift register each include twelve transistors and three capacitors, and the second shift register includes eight transistors and two capacitors; and the display panel further comprises: a first clock signal line, a second clock signal line, a third clock signal line, a fourth clock signal line, a fifth clock signal line, a sixth clock signal line, a seventh clock signal line, an eighth clock signal line, a ninth clock signal line, and a tenth clock signal line; a first low-voltage signal line, a second low-voltage signal line, a third low- voltage signal line, and a fourth low-voltage signal line; a first high-voltage signal line, a second high-voltage signal line, a third high-voltage signal line, and a fourth high-voltage signal line; and a first start signal line, wherein the first shift register is electrically connected to the first clock signal line, the second clock signal line, the first high-voltage signal line, and the first low-voltage signal line;

the second shift register is electrically connected to two of the third clock signal line, the fourth clock signal line, the fifth clock signal line, and the sixth clock signal line, and is electrically connected to the second low-voltage signal line, the first start signal line and the second high-voltage signal line;

the third shift register is electrically connected to the seventh clock signal line, the eighth clock signal line, the third high-voltage signal line, and the third low-voltage signal line; and the fourth shift register is electrically connected to the ninth clock signal line, the tenth clock signal line, the fourth high-voltage signal line, and the fourth low-voltage signal line.

8. The display panel according to claim 7, wherein a row of pixel circuits is correspondingly connected to one first shift register, two third shift registers and one fourth shift register; wherein the two sides include a side at which the fourth shift register is located; and at the side and along a direction that is in the first direction and from the side to the plurality of pixel circuits, a ninth clock signal line, a tenth clock signal line, a fourth high-voltage signal line, a fourth low-voltage signal line, a seventh clock signal line, an eighth clock signal line, a third high-voltage signal line, a third low-voltage signal line, a second low-voltage signal line, a third clock signal line, a fourth clock signal line, a fifth clock signal line, a sixth clock signal line, a first start signal line, and a second high-voltage signal line are arranged in sequence; and the two sides include a side at which the first shift register is located; and at the side and along the direction that is in the first direction and from the side to the plurality of pixel circuits, a first clock signal line, a second clock signal line, a first high-voltage signal line, a first low-voltage signal line, a seventh clock signal line, an eighth clock signal line, a third high-voltage signal line, a third low-voltage signal line, a second low-voltage signal line, a third clock signal line, a fourth clock signal line, a fifth clock signal line, a sixth clock signal line, a first start signal line, and a second high-voltage signal line are arranged in sequence.

9. The display panel according to claim 1, wherein the bias sub-circuit includes a first transistor; and of the first transistor, a control electrode is electrically connected to the first shift register, a first electrode is electrically connected to the reference voltage terminal, and a second electrode is electrically connected to the source of the driving transistor;

the data writing sub-circuit includes a second transistor; and of the second transistor, a control electrode is electrically connected to the second shift register, a first electrode is electrically connected to the data signal terminal, and a second electrode is electrically connected to the source of the driving transistor;

the compensation sub-circuit includes a third transistor; and of the third transistor, a control electrode is electrically connected to the second shift register, a first electrode is electrically connected to the drain of the driving transistor, and a second electrode is electrically connected to the first node;

the leakage prevention sub-circuit includes a fourth transistor; and of the fourth transistor, a control electrode is electrically connected to the third shift register, a first electrode is electrically connected to the first node, and a second electrode is electrically connected to the gate of the driving transistor;

the reset sub-circuit includes a fifth transistor and a sixth transistor, wherein of the fifth transistor, a control electrode is electrically connected to the first shift register, a first electrode is electrically connected to an initial voltage terminal, a second electrode is electrically connected to the first node; and of the sixth transistor, a control electrode is electrically connected to the first shift register, a first electrode is electrically connected to the initial voltage terminal, and a second electrode is electrically connected to the light-emitting device; or the display panel further comprises at least one fifth shift register; of the fifth transistor, the control electrode is electrically connected to a fifth shift register, the first electrode is electrically connected to the initial voltage terminal, the second electrode is electrically connected to the first node; and of the sixth transistor, the control electrode is electrically connected to the fifth shift register, the first electrode is electrically connected to the initial voltage terminal, and the second electrode is electrically connected to the light-emitting device; and the light-emission control sub-circuit includes a seventh transistor and an eighth transistor, wherein of the seventh transistor, a control electrode is electrically connected to the fourth shift register, a first electrode is electrically connected to the first voltage signal terminal, a second electrode is electrically connected to the source of the driving transistor; and of the eighth transistor, a control electrode is electrically connected to the fourth shift register, a first electrode is electrically connected to the drain of the driving transistor, and a second electrode is electrically connected to the light-emitting device.

10. The display panel according to claim 1, wherein a frame period of the display panel includes a refresh frame period including a first bias phase, a reset phase after the first bias phase, a data writing phase after the reset phase, a second bias phase after the data writing phase, and a light-emitting phase after the second bias phase;

the first shift register is configured to output the first scanning signal in the first bias phase and the second bias phase;

the second shift register is configured to output the second scanning signal in the data writing phase;

the third shift register is configured to output the third scanning signal in the reset phase and the data writing phase;

the fourth shift register is configured to output the fourth scanning signal in the light-emitting phase; and in a case where the reset sub-circuit is electrically connected to the first shift register, the first shift register is further configured to output the first scanning signal in the reset phase; or in a case where the display panel further comprises at least one fifth shift register, a fifth shift register is configured to output a fifth scanning signal in the reset phase.

11. A display apparatus, comprising:

the display panel according to claim 1, wherein the display panel includes a plurality of sub-pixels; and a driving circuit board, electrically connected to the plurality of sub-pixels and configured to transmit data signals to the plurality of sub-pixels.

12. A display panel comprising:

a plurality of pixel circuits, arranged in multiple rows and multiple columns;

a plurality of light-emitting devices;

at least one first shift register, a first shift register being correspondingly connected to at least one row of pixel circuits, and the first shift register being configured to transmit a first scanning signal to the at least one row of pixel circuits correspondingly connected thereto;

at least one second shift register, a second shift register being correspondingly connected to a row of pixel circuits, and the second shift register being configured to transmit a second scanning signal to the row of pixel circuits correspondingly connected thereto;

at least one third shift register, a third shift register being correspondingly connected to at least one row of pixel circuits, and the third shift register being configured to transmit a third scanning signal to the at least one row of pixel circuits correspondingly connected thereto; and at least one fourth shift register, a fourth shift register being correspondingly connected to at least one row of pixel circuits, and the fourth shift register being configured to transmit a fourth scanning signal to the at least one row of pixel circuits correspondingly connected thereto;

wherein a pixel circuit of the plurality of pixel circuits includes a driving transistor, a bias sub-circuit, a data writing sub-circuit, a compensation sub-circuit, a leakage prevention sub-circuit, a reset sub-circuit, and a light-emission control sub-circuit, wherein the bias sub-circuit is electrically connected to the first shift register, a reference voltage terminal and a source of the driving transistor, and is configured to, under control of the first scanning signal, transmit a reference voltage from the reference voltage terminal to the source of the driving transistor;

the data writing sub-circuit is electrically connected to the second shift register, a data signal terminal and the source of the driving transistor, and is configured to, under control of the second scanning signal, transmit a data signal from the data signal terminal to the source of the driving transistor;

the compensation sub-circuit is electrically connected to the second shift register, a drain of the driving transistor and a first node, and is configured to, under control of the second scanning signal, transmit a compensated data signal to the first node;

the leakage prevention sub-circuit is electrically connected to the third shift register, the first node and a gate of the driving transistor, and is configured to, under control of the third scanning signal, cause a connection to be formed between the first node and the gate of the driving transistor;

the reset sub-circuit is electrically connected to the first node and a light-emitting device, electrically connected to the pixel circuit, of the plurality light-emitting devices, and is configured to reset a voltage of the first node and a voltage of the light-emitting device; and the light-emission control sub-circuit is electrically connected to the fourth shift register, a first voltage signal terminal, the driving transistor and the light-emitting device, and is configured to, under control of the fourth scanning signal, cause a path to be formed between the driving transistor and the light-emission control sub-circuit to transmit a driving current to the light-emitting device;

wherein a row of pixel circuits is correspondingly connected to one third shift register, two first shift registers and one fourth shift register; and the row of pixel circuits has opposite two sides along a first direction, and the first direction is a direction in which the row of pixel circuits is arranged, wherein the fourth shift register and one of the first shift registers are located at one side of the two sides, and the third shift register and an other one of the first shift registers are located at an other side of the two sides.

13. The display panel according to claim 12, wherein the first shift register, the third shift register and the fourth shift register each include twelve transistors and three capacitors, and the second shift register includes eight transistors and two capacitors; and the display panel further comprises: a first clock signal line, a second clock signal line, a third clock signal line, a fourth clock signal line, a fifth clock signal line, a sixth clock signal line, a seventh clock signal line, an eighth clock signal line, a ninth clock signal line, and a tenth clock signal line; a first low-voltage signal line, a second low-voltage signal line, a third low- voltage signal line, and a fourth low-voltage signal line; a first high-voltage signal line, a second high-voltage signal line, a third high-voltage signal line, and a fourth high-voltage signal line; and a first start signal line, wherein the first shift register is electrically connected to the first clock signal line, the second clock signal line, the first high-voltage signal line, and the first low-voltage signal line;

the second shift register is electrically connected to two of the third clock signal line, the fourth clock signal line, the fifth clock signal line, and the sixth clock signal line, and is electrically connected to the second low-voltage signal line, the first start signal line and the second high-voltage signal line;

the third shift register is electrically connected to the seventh clock signal line, the eighth clock signal line, the third high-voltage signal line, and the third low-voltage signal line; and the fourth shift register is electrically connected to the ninth clock signal line, the tenth clock signal line, the fourth high-voltage signal line, and the fourth low-voltage signal line;

wherein a row of pixel circuits is correspondingly connected to one third shift register, two first shift registers and one fourth shift register; wherein the two sides include a side at which the fourth shift register is located; and at the side and along a direction that is in the first direction and from the side to the plurality of pixel circuits, a ninth clock signal line, a tenth clock signal line, a fourth high-voltage signal line, a fourth low-voltage signal line, a first clock signal line, a second clock signal line, a first high-voltage signal line, a first low-voltage signal line, a second low-voltage signal line, a third clock signal line, a fourth clock signal line, a fifth clock signal line, a sixth clock signal line, a first start signal line, and a second high-voltage signal line are arranged in sequence; and the two sides include a side at which the third shift register is located; and at the side and along the direction that is in the first direction and from the side to the plurality of pixel circuits, a seventh clock signal line, an eighth clock signal line, a third high-voltage signal line, a third low-voltage signal line, a first clock signal line, a second clock signal line, a first high-voltage signal line, a first low-voltage signal line, a second low-voltage signal line, a third clock signal line, a fourth clock signal line, a fifth clock signal line, a sixth clock signal line, a first start signal line, and a second high-voltage signal line are arranged in sequence.

14. A display panel, comprising:

a plurality of pixel circuits, arranged in multiple rows and multiple columns;

a plurality of light-emitting devices;

at least one first shift register, a first shift register being correspondingly connected to at least one row of pixel circuits, and the first shift register being configured to transmit a first scanning signal to the at least one row of pixel circuits correspondingly connected thereto;

at least one second shift register, a second shift register being correspondingly connected to a row of pixel circuits, and the second shift register being configured to transmit a second scanning signal to the row of pixel circuits correspondingly connected thereto;

at least one third shift register, a third shift register being correspondingly connected to at least one row of pixel circuits, and the third shift register being configured to transmit a third scanning signal to the at least one row of pixel circuits correspondingly connected thereto;

at least one fourth shift register, a fourth shift register being correspondingly connected to at least one row of pixel circuits, and the fourth shift register being configured to transmit a fourth scanning signal to the at least one row of pixel circuits correspondingly connected thereto; and at least one fifth shift register, a fifth shift register being correspondingly connected to at least one row of pixel circuits, and the fifth shift register being configured to transmit a fifth scanning signal to the at least one row of pixel circuits correspondingly connected thereto, wherein the first scanning signal and the fifth scanning signal are different scanning signals;

wherein a pixel circuit of the plurality of pixel circuits includes a driving transistor, a bias sub-circuit, a data writing sub-circuit, a compensation sub-circuit, a leakage prevention sub-circuit, a reset sub-circuit, and a light-emission control sub-circuit, wherein the bias sub-circuit is electrically connected to the first shift register, a reference voltage terminal and a source of the driving transistor, and is configured to, under control of the first scanning signal, transmit a reference voltage from the reference voltage terminal to the source of the driving transistor;

the data writing sub-circuit is electrically connected to the second shift register, a data signal terminal and the source of the driving transistor, and is configured to, under control of the second scanning signal, transmit a data signal from the data signal terminal to the source of the driving transistor;

the compensation sub-circuit is electrically connected to the second shift register, a drain of the driving transistor and a first node, and is configured to, under control of the second scanning signal, transmit a compensated data signal to the first node;

the leakage prevention sub-circuit is electrically connected to the third shift register, the first node and a gate of the driving transistor, and is configured to, under control of the third scanning signal, cause a connection to be formed between the first node and the gate of the driving transistor;

the reset sub-circuit is electrically connected to the first node and a light-emitting device, electrically connected to the pixel circuit, of the plurality of light-emitting devices, and is configured to reset a voltage of the first node and a voltage of the light-emitting device; and the light-emission control sub-circuit is electrically connected to the fourth shift register, a first voltage signal terminal, the driving transistor and the light-emitting device, and is configured to, under control of the fourth scanning signal, cause a path to be formed between the driving transistor and the light-emission control sub-circuit to transmit a driving current to the light-emitting device;

the reset sub-circuit is further electrically connected to the fifth shift register and an initial voltage terminal, and the reset sub-circuit is configured to, under control of the fifth scanning signal, transmit an initial voltage from the initial voltage terminal to the first node and the light-emitting device;

wherein a row of pixel circuits is electrically connected to one first shift register, one third shift register, one fourth shift register and one fifth shift register; and the row of pixel circuits has opposite two sides along a first direction; the fourth shift register and the fifth shift register are located at one side of the two sides, and the fourth shift register is further away from the row of pixel circuits than the fifth shift register; the first shift register and the third shift register are located at an other side of the two sides, and the third shift register is further away from the row of pixel circuits than the first shift register; and the first direction is a direction in which the row of pixel circuits is arranged.

15. The display panel according to claim 14, wherein the first shift register, the third shift register and the fourth shift register each include twelve transistors and three capacitors, and the second shift register includes eight transistors and two capacitors; and the display panel further comprises: a first clock signal line, a second clock signal line, a third clock signal line, a fourth clock signal line, a fifth clock signal line, a sixth clock signal line, a seventh clock signal line, an eighth clock signal line, a ninth clock signal line, and a tenth clock signal line; a first low-voltage signal line, a second low-voltage signal line, a third low-voltage signal line, a fourth low-voltage signal line, a fifth low-voltage signal line, a sixth low-voltage signal line, and a seventh low-voltage signal line; a first high-voltage signal line, a second high-voltage signal line, a third high-voltage signal line, and a fourth high-voltage signal line; and a first start signal line, a second start signal line, a third start signal line, and a fourth start signal line, wherein the first shift register is electrically connected to the first low-voltage signal line, the first clock signal line, the second clock signal line, the first start signal line, the first high-voltage signal line, and the second low-voltage signal line;

the second shift register is electrically connected to two of the third clock signal line, the fourth clock signal line, the fifth clock signal line, and the sixth clock signal line, and is electrically connected to the third low-voltage signal line, the second start signal line and the second high-voltage signal line;

the third shift register is electrically connected to the fourth low-voltage signal line, the seventh clock signal line, the eighth clock signal line, the third start signal line, the third high-voltage signal line, and the fifth low-voltage signal line; and the fourth shift register is electrically connected to the sixth low-voltage signal line, the ninth clock signal line, the tenth clock signal line, the fourth start signal line, the fourth high-voltage signal line, and the seventh low-voltage signal line;

the display panel further comprises an eleventh clock signal line, a twelfth clock signal line, a thirteenth clock signal line, a fourteenth clock signal line, an eighth low-voltage signal line, a fifth high-voltage signal line, and a fifth start signal line, wherein a fifth shift register is electrically connected to two of the eleventh clock signal line, the twelfth clock signal line, the thirteenth clock signal line, and the fourteenth clock signal line, and is electrically connected to the eighth low-voltage signal line, the fifth start signal line and the fifth high-voltage signal line.

16. The display panel according to claim 15, wherein the two sides include a side at which the fourth shift register and the fifth shift register are located; and at the side and along a direction that is in the first direction and from the side to the plurality of pixel circuits, a sixth low-voltage signal line, a ninth clock signal line, a tenth clock signal line, a fourth start signal line, a fourth high-voltage signal line, a seventh low-voltage signal line, an eighth low-voltage signal line, an eleventh clock signal line, a twelfth clock signal line, a thirteenth clock signal line, a fourteenth clock signal line, a fifth start signal line, a fifth high-voltage signal line, a third low-voltage signal line, a third clock signal line, a fourth clock signal line, a fifth clock signal line, a sixth clock signal line, a second start signal line, and a second high-voltage signal line are arranged in sequence; and the two sides include a side at which the first shift register and the third shift register are located; and at the side and along the direction that is in the first direction and from the side to the plurality of pixel circuits, a fourth low-voltage signal line, a seventh clock signal line, an eighth clock signal line, a third start signal line, a third high-voltage signal line, a fifth low-voltage signal line, a first low-voltage signal line, a first clock signal line, a second clock signal line, a first start signal line, a first high-voltage signal line, a second low-voltage signal line, a third low-voltage signal line, a third clock signal line, a fourth clock signal line, a fifth clock signal line, a sixth clock signal line, a second start signal line, and a second high-voltage signal line are arranged in sequence.

17. The display panel according to claim 14, wherein the first shift register, the third shift register and the fourth shift register each include twelve transistors and three capacitors, and the second shift register includes eight transistors and two capacitors; and the display panel further comprises: a first clock signal line, a second clock signal line, a third clock signal line, a fourth clock signal line, a fifth clock signal line, a sixth clock signal line, a seventh clock signal line, an eighth clock signal line, a ninth clock signal line, and a tenth clock signal line; a first low-voltage signal line, a second low-voltage signal line, a third low-voltage signal line, and a fourth low-voltage signal line; a first high-voltage signal line, a second high-voltage signal line, a third high-voltage signal line, and a fourth high-voltage signal line; and a first start signal line, wherein the first shift register is electrically connected to the first clock signal line, the second clock signal line, the first high-voltage signal line, and the first low-voltage signal line;

the second shift register is electrically connected to two of the third clock signal line, the fourth clock signal line, the fifth clock signal line, and the sixth clock signal line, and is electrically connected to the second low-voltage signal line, the first start signal line and the second high-voltage signal line;

the third shift register is electrically connected to the seventh clock signal line, the eighth clock signal line, the third high-voltage signal line, and the third low-voltage signal line; and the fourth shift register is electrically connected to the ninth clock signal line, the tenth clock signal line, the fourth high-voltage signal line, and the fourth low-voltage signal line;

the display panel further comprises an eleventh clock signal line, a twelfth clock signal line, a thirteenth clock signal line, a fourteenth clock signal line, a fifth low-voltage signal line, a second start signal line, and a fifth high-voltage signal line, wherein a fifth shift register is electrically connected to two of the eleventh clock signal line, the twelfth clock signal line, the thirteenth clock signal line, and the fourteenth clock signal line, and is electrically connected to the fifth low-voltage signal line, the second start signal line and the fifth high-voltage signal line.

18. The display panel according to claim 17, wherein the two sides include a side at which the fourth shift register and the fifth shift register are located; and at the side and along a direction that is in the first direction and from the side to the plurality of pixel circuits, a ninth clock signal line, a tenth clock signal line, a fourth high-voltage signal line, a fourth low-voltage signal line, a fifth low-voltage signal line, an eleventh clock signal line, a twelfth clock signal line, a thirteenth clock signal line, a fourteenth clock signal line, a second start signal line, a fifth high-voltage signal line, a second low-voltage signal line, a third clock signal line, a fourth clock signal line, a fifth clock signal line, a sixth clock signal line, a first start signal line, and a second high-voltage signal line are arranged in sequence; and the two sides include a side at which the first shift register and the third shift register are located; and at the side and along the direction that is in the first direction and from the side to the plurality of pixel circuits, a seventh clock signal line, an eighth clock signal line, a third high-voltage signal line, a third low-voltage signal line, a first clock signal line, a second clock signal line, a first high-voltage signal line, a first low-voltage signal line, a second low-voltage signal line, a third clock signal line, a fourth clock signal line, a fifth clock signal line, a sixth clock signal line, a first start signal line, and a second high-voltage signal line are arranged in sequence.

* * * * *